US012603242B2

(12) United States Patent
Jang et al.

(10) Patent No.: US 12,603,242 B2
(45) Date of Patent: Apr. 14, 2026

(54) ELECTROMAGNETIC CONTACTOR CAPABLE OF EFFECTIVELY EXTINGUISHING ARC

(71) Applicant: LS ELECTRIC CO., LTD., Anyang-si (KR)

(72) Inventors: Kyeonghun Jang, Anyang-si (KR); Deokyong Yun, Anyang-si (KR); Minseok Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 725 days.

(21) Appl. No.: 17/767,787

(22) PCT Filed: Apr. 9, 2020

(86) PCT No.: PCT/KR2020/095063
§ 371 (c)(1),
(2) Date: Apr. 8, 2022

(87) PCT Pub. No.: WO2021/075945
PCT Pub. Date: Apr. 22, 2021

(65) Prior Publication Data

US 2024/0087830 A1 Mar. 14, 2024

(30) Foreign Application Priority Data

Oct. 17, 2019 (KR) ........................ 10-2019-0129376

(51) Int. Cl.
*H01H 73/18* (2006.01)
*H01H 9/34* (2006.01)
(Continued)

(52) U.S. Cl.
CPC ............ *H01H 73/18* (2013.01); *H01H 9/342* (2013.01); *H01H 50/18* (2013.01); *H01H 50/546* (2013.01); *H01H 73/04* (2013.01)

(58) Field of Classification Search
CPC . H01H 9/30-465; H01H 50/546; H01H 73/18
See application file for complete search history.

(56) References Cited

U.S. PATENT DOCUMENTS 6,703,575 B1 3/2004 Yamamoto
7,541,901 B2 * 6/2009 Nakano .................. H01H 9/302
335/201

(Continued)

FOREIGN PATENT DOCUMENTS

CN 1291341 A 4/2001
CN 102509671 A 6/2012

(Continued)

OTHER PUBLICATIONS

Office Action for related Japanese Application No. 2022-520942; action dated Nov. 16, 2023; (4 pages).

(Continued)

*Primary Examiner* — Shawki S Ismail
(74) *Attorney, Agent, or Firm* — K&L Gates LLP

(57) ABSTRACT

An electromagnetic contactor is disclosed. An electromagnetic contactor according to an embodiment of the present disclosure includes an arc extinguishing unit. The air extinguishing unit is configured to surround a position where a fixed contactor and a movable contactor are in contact with each other. Accordingly, an arc generated between the fixed contactor and the movable contactor can extend toward a grid without arbitrarily flowing in an inner space of the electromagnetic contactor. Further included is an arc box unit according to an embodiment of the present disclosure. An arc outlet is formed passing through the arc box unit. An arc that is extinguished while passing through the grid can be discharged to the outside of the electromagnetic contactor through the arc outlet. Accordingly, the arc can be extinguished and discharged quickly and effectively. As a result, (Continued)

components of the electromagnetic contactor are not damaged by the generated arc.

13 Claims, 15 Drawing Sheets

(51) Int. Cl.

| | |
|---|---|
| ***H01H 50/18*** | (2006.01) |
| ***H01H 50/54*** | (2006.01) |
| ***H01H 73/04*** | (2006.01) |

(56) References Cited

U.S. PATENT DOCUMENTS

| | | | | |
|---|---|---|---|---|
| 2018/0182584 | A1* | 6/2018 | Iwamoto | H01H 50/18 |
| 2020/0027677 | A1* | 1/2020 | Lim | H01H 71/0207 |

FOREIGN PATENT DOCUMENTS

| | | | | |
|---|---|---|---|---|
| CN | 104704594 | A | 6/2015 | |
| CN | 104779120 | A | 7/2015 | |
| CN | 109830405 | A | 5/2019 | |
| JP | S55173839 | U | 12/1980 | |
| JP | S59121715 | A | 7/1984 | |
| JP | H01294319 | A | 11/1989 | |
| JP | H07282705 | A | 10/1995 | |
| JP | H09231854 | A | 9/1997 | |
| JP | H11242924 | A | 9/1999 | |
| JP | 2012199120 | A | 10/2012 | |
| JP | 2014056768 | A | 3/2014 | |
| JP | 20140456768 | A | 3/2014 | |
| JP | 2015049937 | A | 3/2015 | |
| JP | 6531879 | B1 | 6/2019 | |
| KR | 2019980042913 | U | 9/1998 | |
| KR | 2020000015895 | U | 8/2000 | |
| KR | 20080062942 | A | 7/2008 | |
| KR | 2020090003845 | U | 4/2009 | |
| KR | 101661396 | B1 | 9/2016 | |
| KR | 101818565 | B1 | 1/2018 | |
| KR | 20180041781 | A | 4/2018 | |
| WO | WO-2020079768 | A1 * | 4/2020 | H01H 50/54 |

OTHER PUBLICATIONS

Notice of Allowance for related Japanese Application No. 2022-520942; action dated Mar. 26, 2024; (3 pages).

Extended European Search Report for related European Application No. 20875892.0; action dated Jan. 30, 2024; (11 pages).

Office Action for related Chinese Application No. 202080072564.X; action dated Apr. 29, 2024; (9 pages).

Office Action for related Japanese Application No. 2022-520942; action dated Jun. 27, 2023; (6 pages).

International Search Report for related International Application No. PCT/KR2020/095063; report dated Apr. 22, 2021; (5 pages).

Written Opinion for related International Application No. PCT/KR2020/095063; report dated Apr. 22, 2021; (5 pages).

Notice of Allowance for related Korean Application No. 10-2019-0129376; action dated Jun. 21, 2021; (2 pages).

Office Action for related Korean Application No. 10-2019-0129376; action dated Dec. 12, 2020; (6 pages).

* cited by examiner

ELECTROMAGNETIC CONTACTOR CAPABLE OF EFFECTIVELY EXTINGUISHING ARC

CROSS-REFERENCE TO RELATED APPLICATIONS

This application is the National Stage filing under 35 U.S.C. 371 of International Application No. PCT/KR2020/095063, filed on Apr. 9, 2020, which claims the benefit of earlier filing date and right of priority to Korea utility model Application No. 10-2019-0129376 filed on Oct. 17, 2019, the contents of which are all hereby incorporated by reference herein in their entirety.

FIELD

The present disclosure relates to a magnetic contactor, and more particularly, to a magnetic contactor having a structure in which an arc generated when a fixed contact and a movable contact are separated from each other can be effectively extinguished and discharged.

BACKGROUND

A magnetic contactor (MC) is a mechanism for opening and closing a circuit by an electrical control signal. Magnetic contactors (or electromagnetic contactor) are generally used to remotely control electric devices such as electric motors.

The magnetic contactor includes a coil, a movable core and a fixed core. When a current is applied to the magnetic contactor, the fixed core is magnetized by a magnetic field generated by the coil. The magnetized fixed core applies a magnetic attractive force to the movable core, so that the movable core can moved toward the fixed core.

Accordingly, a crossbar connected to the movable core and the movable contact connected to the crossbar are moved toward the fixed contact. When the movable contact is in contact with the fixed contact, a current may be applied to an external electric device that is electrically connected to the fixed contact.

Accordingly, in an electric device such as an electric motor, the application of power may be permitted or blocked by the magnetic contactor even if power is not directly controlled. That is, the magnetic contactor may function as a switch for controlling the electric device such as the electric motor.

On the other hand, when the current applied to the magnetic contactor is released, the magnetization of the fixed core is released. Accordingly, the movable core is moved away from the fixed core by a return member such as a spring. As a result, the movable contact is also moved to be separated from the fixed contact, and the application of power to the electric device is interrupted.

However, when the fixed contact and the movable contact are separated from each other, an arc is generated by the current being applied. The arc may be defined as a flow of high-temperature and high-pressure plasma. Therefore, when the arc remains inside the magnetic contactor, there may be a fear that components of the magnetic contactor are damaged by the arc.

Furthermore, along with the trend of high specification of conditions provided with the magnetic contactor, such as the capacity of a power generation facility, the requirements for the magnetic contactor are also being advanced.

In particular, the case of adjusting the technical requirements related to the magnetic contactor to "Type 2 Coordination" is becoming common. Various conditions for satisfying the conditions include rapid extinguishing and discharge of the generated arc.

Accordingly, various techniques for extinguishing or discharging an arc generated in the magnetic contactor have been introduced.

Korean Laid-open Utility Model No. 20-2009-0003845 discloses an arc extinguishing apparatus of a magnetic contactor for easily fastening a plurality of grids. Specifically, an arc extinguishing apparatus having a structure in which a plurality of grids are integrated using a support member having fitting grooves to be easily coupled is disclosed.

However, this type of arc extinguishing apparatus can facilitate the coupling of the grids but any method for guiding the generated arc to the grids is not considered.

Korean Patent Registration No. 10-1818565 discloses an arc chute for a magnetic contactor having a structure capable of improving arc extinguishing power. Specifically, an arc chute for a magnetic contactor having a structure capable of guiding a movement of a generated arc by using an arc horn that guides the generated arc to grids using a magnetic field generated in a blowout coil.

However, the arc chute of the magnetic contactor having this structure has a limitation in that a large arc horn is separately required. That is, considering that the magnetic contactor is generally formed in a small size, an excessive space must be occupied to provide the arc horn.

Moreover, the arc chute of the magnetic contactor having the structure can be applied only when the grids are arranged in a specific shape. That is, there is a limit in that the arc horn can be applied only when the grids are arranged in a fan-like shape.

Furthermore, those prior art documents have a limitation in that a method for rapidly extinguishing or discharging the arc in order to satisfy the aforementioned "Type 2 Coordination" is not suggested.

Korean Laid-open Utility Model No. 20-2009-0003845 (Apr. 27, 2009)

Korea Patent Registration No. 10-1818565 (Jan. 15, 2018)

SUMMARY

The present disclosure is directed to providing a magnetic contactor having a structure capable of solving those problems and other drawbacks.

First, one aspect of the present disclosure is to provide a magnetic contactor having a structure capable of effectively extinguishing an arc generated inside.

Another aspect of the present disclosure is to provide a magnetic contactor having a structure capable of preventing a generated arc from flowing in a random space.

Still another aspect of the present disclosure is to provide a magnetic contactor having a structure capable of inducing a generated arc toward grids.

Still another aspect of the present disclosure is to provide a magnetic contactor having a structure capable of effectively discharging an arc passing through grids.

Still another aspect of the present disclosure is to provide a magnetic contactor having a structure capable of forming various discharge paths of a generated arc.

Still another aspect of the present disclosure is to provide a magnetic contactor having a structure capable of preventing an introduction of external foreign substances.

Still another aspect of the present disclosure is to provide a magnetic contactor having a structure capable of improving operational reliability and durability.

In order to achieve those aspects and other advantages of the subject matter disclosed therein, there is provided a magnetic contactor that may include a coil electrically connected to an outside, a fixed core located adjacent to the coil and magnetized by a magnetic field produced by the coil, a movable core spaced apart from the fixed core by a predetermined distance and configured to move toward the fixed core by magnetic attraction generated by the magnetization of the fixed core, a crossbar connected to the movable core and including a movable contact, a fixed contact spaced apart from the movable contact by a predetermined distance, and a plurality of wall portions configured to surround the fixed contact.

The crossbar of the magnetic contactor may extend in one direction, and the plurality of wall portions may include a first wall portion located with being spaced apart from the fixed contact by a predetermined distance in the one direction.

The first wall portion of the magnetic contactor may extend toward the movable contact by a predetermined length.

The first wall portion of the magnetic contactor may include an arc through hole formed therethrough in the one direction.

The arc through hole of the magnetic contactor may be provided in plurality disposed with being spaced apart by predetermined distances.

The arc through hole of the magnetic contactor may extend at a predetermined angle with respect to the one direction.

The first wall portion of the magnetic contactor may extend toward the movable contact by the predetermined length, and one side of the arc through hole facing the movable contact may be formed through the first wall portion.

The plurality of wall portions of the magnetic contactor may include a second wall portion located adjacent to the fixed contact and disposed to form a predetermined angle with respect to the one direction, and the second wall portion may extend toward the movable contact by a predetermined distance.

The plurality of wall portions of the magnetic contactor may include a third wall portion located adjacent to the fixed contact, disposed to form a predetermined angle with respect to the one direction, and facing the second wall portion with the fixed contact interposed therebetween, and the third wall portion may extend toward the movable contact by a predetermined length.

The magnetic contactor may further include a grid located adjacent to the movable contact and having one side extending toward the fixed contact, and an arc box part defining an inner space to accommodate the grid. The arc box part may include an arc outlet located adjacent to another side of the grid, and formed therethrough such that the inner space of the arc box part communicates with the outside.

In order to achieve those aspects and other advantages of the subject matter disclosed therein, there is provided a magnetic contactor that may include an arc box part having an inner space, a fixed contact accommodated in the inner space of the arc box part, a movable contact accommodated in the inner space, located adjacent to the fixed contact, and configured to be brought into contact with or separated from the fixed contact, and a grid accommodated in the inner space, located adjacent to the movable contact, and having one side extending toward the fixed contact. The arc box part may include an arc outlet located adjacent to another side of the grid, and formed therethrough such that the inner space of the arc box part communicates with the outside.

The arc outlet of the magnetic contactor may extend in a direction away from the fixed contact, and one end portion of the arc outlet in the direction away from the fixed contact may be open.

The arc outlet of the magnetic contactor may include a first inner surface extending in a direction away from the fixed contact, a second inner surface facing the first inner surface and extending in the direction away from the fixed contact, a third inner surface extending between one end portion of the first inner surface and one end portion of the second inner surface that face the fixed contact, and openings facing the third inner surface, located adjacent to another end portions of the first inner surface and the second inner surface, and formed in an open shape.

The arc outlet of the magnetic contactor may extend at a predetermined angle with respect to a direction away from the fixed contact.

The arc outlet of the magnetic contactor may include a first inner surface extending in a direction forming a predetermined angle with a direction away from the fixed contact, a second inner surface facing the first inner surface and extending in the direction forming the predetermined angle with the direction away from the fixed contact, a third inner surface extending between one end portion of the extended first inner surface and one end portion of the extended second inner surface, and a fourth inner surface facing the third inner surface and extending between another end portion of the extended first inner surface and another end portion of the extended second inner surface.

The arc outlet of the magnetic contactor may be provided in plurality disposed with being spaced apart by predetermined distances.

The magnetic contactor may further include a mesh portion configured to cover the arc outlet and having a plurality of openings.

The magnetic contactor may further include a plurality of wall portions configured to surround the fixed contact.

According to the present disclosure, the following effects can be achieved.

First, an arc outlet may be formed through an arc box part. An arc generated when a fixed contactor and a movable contactor are separated from each other may be discharged through the arc outlet.

Accordingly, the generated arc can be effectively extinguished.

The fixed contactor and the movable contactor may be surrounded by a wall portion. When the arc is generated, the wall portion may function as a kind of fence.

Accordingly, the generated arc can be prevented from flowing in any space inside the magnetic contactor.

In addition, the generated arc may move to an upper open space, namely, to a space where a grid is located after colliding with the wall portion.

This can smoothly guide the generated arc toward the grid.

Also, the arc outlet may be located adjacent to an upper side of the grid. The arc that is extinguished while passing through the grid may be discharged through the adjacent arc outlet.

Accordingly, the extinguished arc can be effectively discharged to the outside of the magnetic contactor.

In addition, an arc through hole may be formed through a first wall portion. Some of the arc moved toward the first wall portion can move toward the arc outlet through the arc through hole.

Thus, the generated arc can flow toward the arc outlet through the arc through hole or the grid. Accordingly, various discharge paths of the generated arc can be formed.

The arc outlet may be provided with a mesh portion. The mesh portion may cover the arc outlet. The mesh portion may include a plurality of openings. The arc extinguished inside the magnetic contactor can be discharged through the mesh portion. On the other hand, foreign substances existing outside the magnetic contactor cannot pass through the mesh portion.

This can prevent such external foreign substances from being introduced into the magnetic contactor.

With the configuration, the arc generated inside can be effectively extinguished and discharged. Furthermore, the arc cannot arbitrarily move in an inner space by a partition.

This can prevent damages on components of the magnetic contactor by the generated arc. Since the generated arc can be effectively extinguished and discharged, an amount of arc remaining in the inner space of the magnetic contactor can be minimized.

This can result in improving operational reliability and durability of the magnetic contactor.

DETAILED DESCRIPTION

Hereinafter, a magnetic contactor 10 according to an implementation of the present disclosure will be described in detail with reference to the accompanying drawings.

In the following description, descriptions of some components may be omitted to help understanding of the present disclosure.

1. Definition of Terms

It will be understood that when an element is referred to as being "connected with" another element, the element can be connected with the another element or intervening elements may also be present.

In contrast, when an element is referred to as being "directly connected with" another element, there are no intervening elements present.

A singular representation used herein may include a plural representation unless it represents a definitely different meaning from the context.

The term "magnetic contactor (MC)" used in the following description refers to a switch controlled using an electromagnet.

Figure 1:
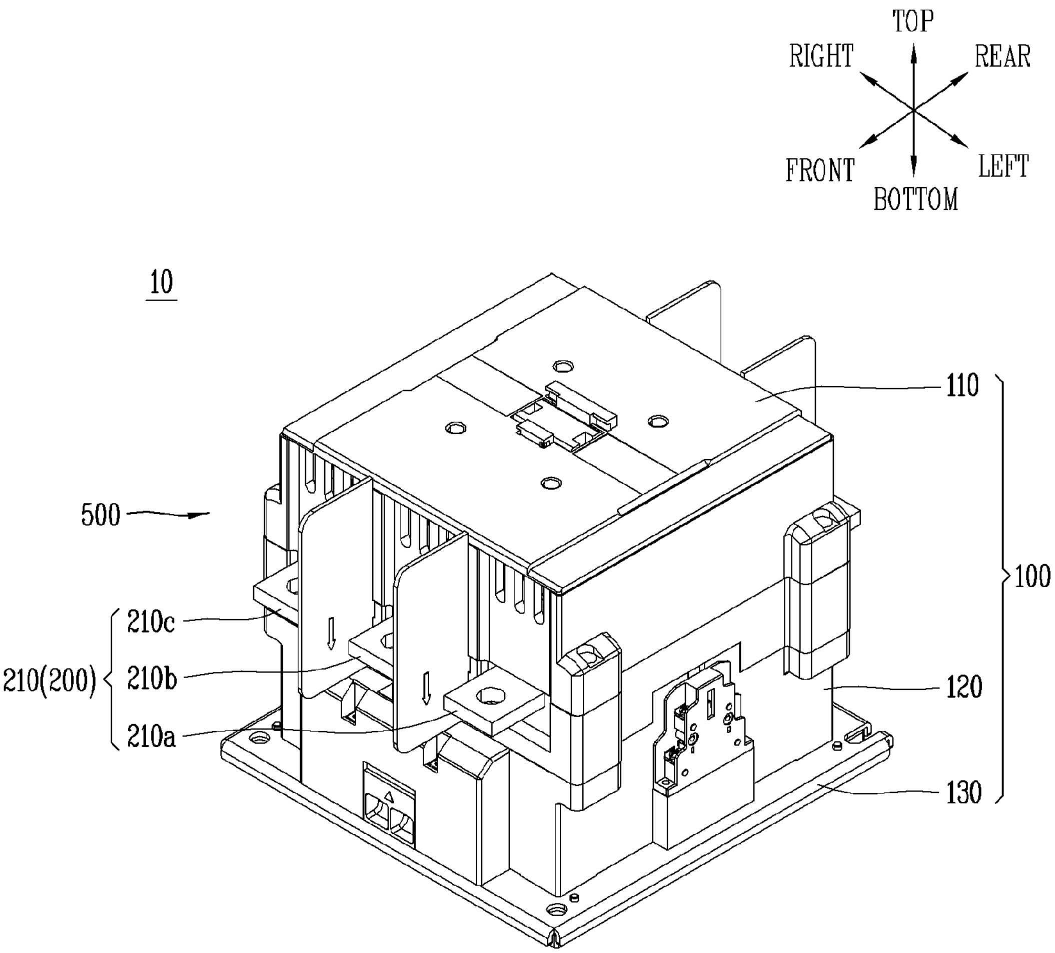
FIG. 1 is a perspective view illustrating a magnetic contactor in accordance with one implementation.

The terms "front", "rear", "top", "bottom", "left" and "right" used in the following description will be understood based on a coordinate system illustrated in FIG. 1.

Figure 2:
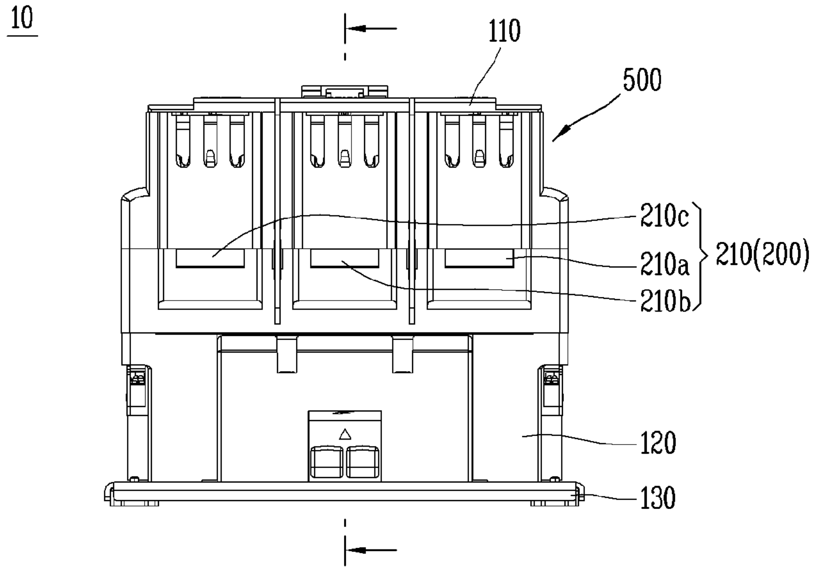
FIG. 2 is a front view of the magnetic contactor of FIG. 1.

2. Description of Configuration of Magnetic Contactor 10 According to Implementation Referring to FIGS. 1 to 3, a magnetic contactor 10 according to an implementation may include a frame part 100, a fixed contactor part 200, and a movable contactor part 400.

The magnetic contactor 10 may further include an arc extinguishing part 400 and an arc box part 500 for effectively extinguishing and discharging an arc.

Figure 3:
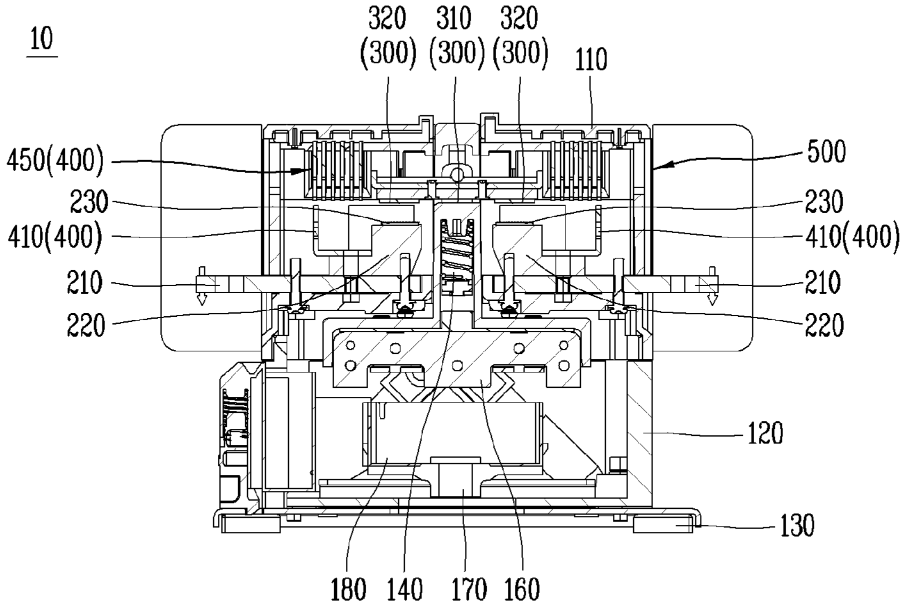
FIG. 3 is a cross-sectional view illustrating the magnetic contactor of FIG. 1, taken along the line A-A.

Hereinafter, the magnetic contactor 10 according to the implementation will be described with reference to FIGS. 1 and 3, and the arc extinguishing part 400 and the arc box part 500 will be described as separate clauses.

(1) Description of Frame Part 100

The frame part 100 may define appearance of the magnetic contactor 10. A predetermined space may be defined inside the frame part 100. Each component provided for the operation of the magnetic contactor 10 may be accommodated in the space.

In addition, the frame part 100 may include components for generating a magnetic force inside the magnetic contactor 10.

Among those components of the frame part 100 to be described later, an upper frame 110, a lower frame 120, and a base 130 that define the appearance may be formed of an insulating material such as synthetic resin. This can prevent an arbitrary electrical connection between inside and outside of the frame part 100.

The frame part 100 may include an upper frame 110, a lower frame 120, a base 130, an elastic portion 140, a support portion 150, a movable core 160, a coil 170, and a fixed core 180.

The upper frame 110 may define an upper side of the frame part 100. The upper frame 110 may be mounted on the arc box part 500. The upper frame 110 may serve as a cover of the arc box part 500.

The arc box part 500 may be located beneath the upper frame 110.

The lower frame 120 may define a lower side of the frame part 500. The arc box part 500 may be mounted on the lower frame 120. The lower frame 120 may be located between the arc box part 500 and the base 130.

A predetermined space may be defined inside the lower frame 120. The space may communicate with a predetermined space defined inside the arc box part 500. Various components for operating the magnetic contactor 10 may be accommodated in the space.

The base 130 may define the bottom of the frame part 100. The base 130 may come in contact with an arbitrary surface such as the ground on which the magnetic contactor 10 is installed. A coupling hole may be formed at the base 130 so that the magnetic contactor 10 is fixed on the arbitrary surface. A coupling member (not illustrated) may be coupled to the coupling hole.

The lower frame 120 may be mounted on the base 130.

In the illustrated implementation, the upper frame 110, the lower frame 120, and the base 130 may have a three-dimensional shape having a rectangular cross section. The upper frame 110, the lower frame 120, and the base 130 may form an arbitrary shape in which components for functioning as the magnetic contactor 10 can be accommodated.

The elastic portion 140 may apply a restoring force for returning a crossbar 310 to its original position after being moved. The elastic portion 140 may elastically support the crossbar 310.

Specifically, when the fixed core 180 is magnetized by a magnetic field produced by applying a current to the coil 170, the fixed core 180 may exert magnetic attraction to the movable core 160. Accordingly, the crossbar 310 that is connected to the movable core 160 may move toward the fixed core 180, namely, downward in the illustrated implementation.

At this time, the crossbar 310 may apply pressure to the elastic portion 140 during the downward movement. The elastic portion 140 may then change in shape and store a restoring force. When the state in which the current is applied to the coil 170 is released, the magnetized state of the fixed core 180 may be demagnetized. The elastic portion 140 may be restored to its original shape, and the crossbar 310 and the movable core 160 may be returned to their original positions.

In the illustrated implementation, the elastic portion 140 may be configured as a coil spring. The elastic portion 140 may be implemented as any member capable of storing the restoring force by being compressed and stretched and applying the stored restoring force to another member.

Figure 7:
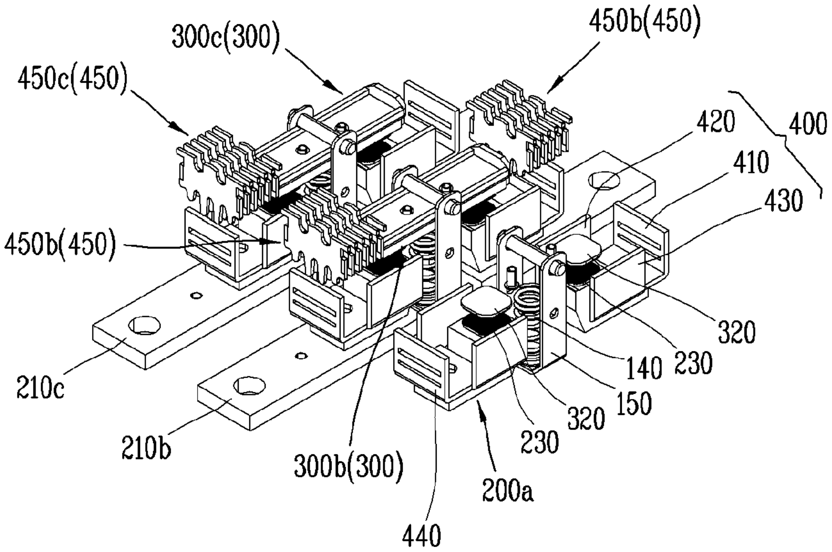
FIG. 7 is a perspective view illustrating a fixed contactor part, a movable contactor part, and an arc extinguishing part provided in the magnetic contactor of FIG. 1.
Figure 8:
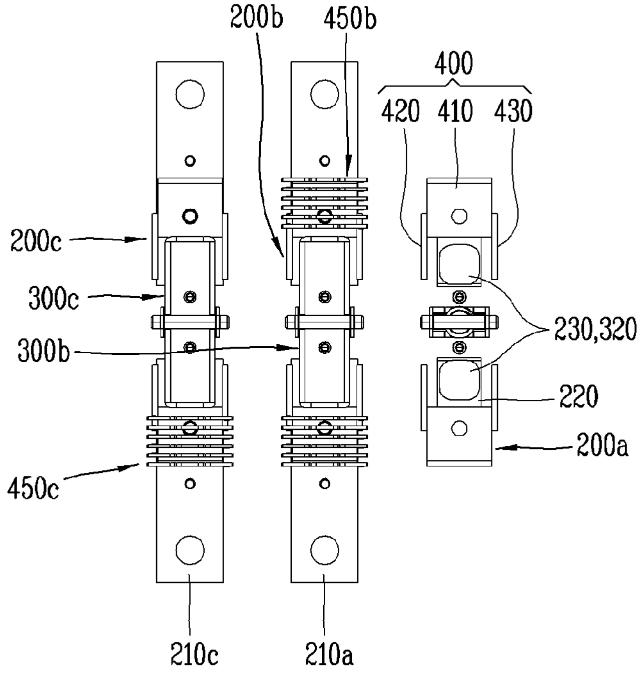
FIG. 8 is a planar view illustrating the fixed contactor part, the movable contactor part, and the arc extinguishing part of FIG. 7.
Figure 9:
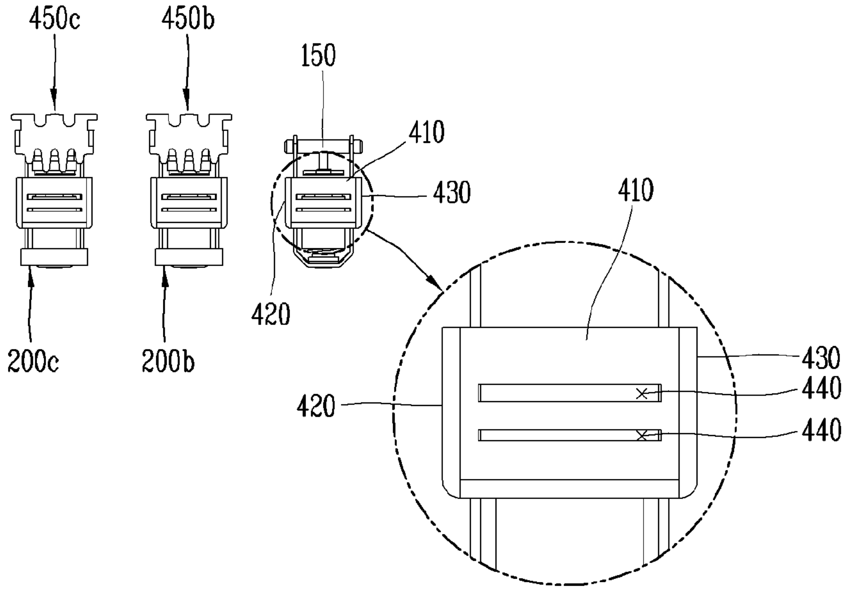
FIG. 9 is a front view illustrating the fixed contactor part, the movable contactor part, and the arc extinguishing part of FIG. 7.
Figure 10:
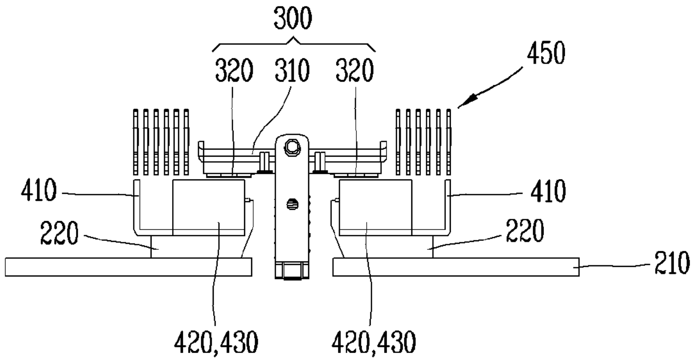
FIG. 10 is a lateral view illustrating the fixed contactor part, the movable contactor part, and the arc extinguishing part of FIG. 7.
Figure 11:
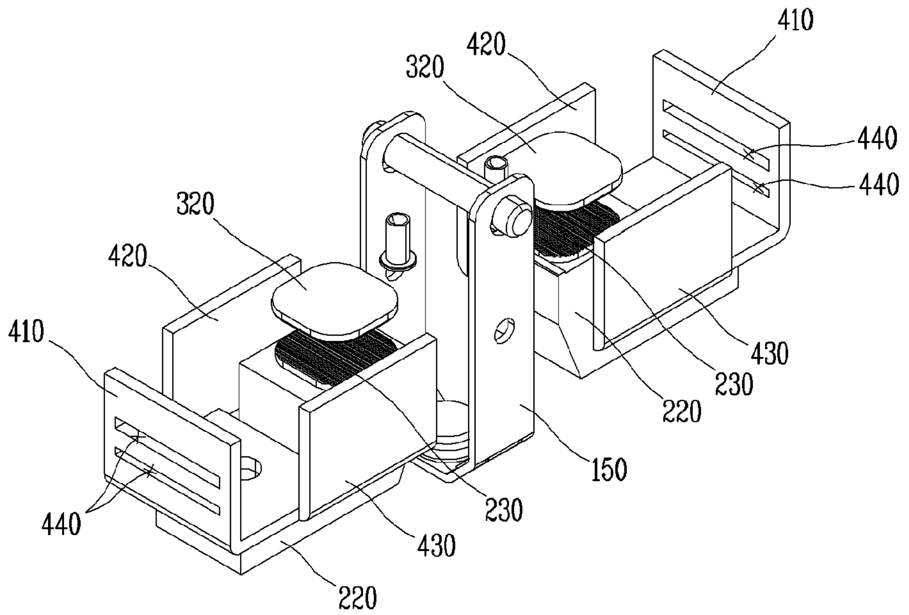
FIG. 11 is a perspective view illustrating the fixed contactor part, the movable contactor part, and the arc extinguishing part of FIG. 7.
Figure 12:
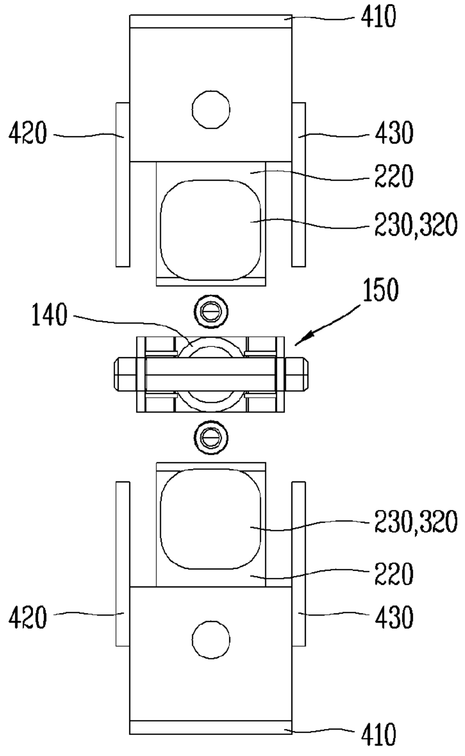
FIG. 12 is a planar view illustrating the fixed contactor part, the movable contactor part, and the arc extinguishing part of FIG. 7.
Figure 13:
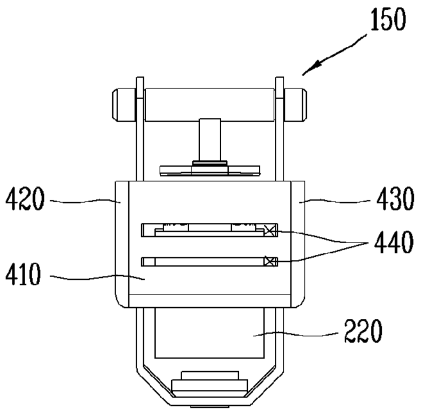
FIG. 13 is a front view illustrating the fixed contactor part, the movable contactor part, and the arc extinguishing part of FIG. 7.
Figure 14:
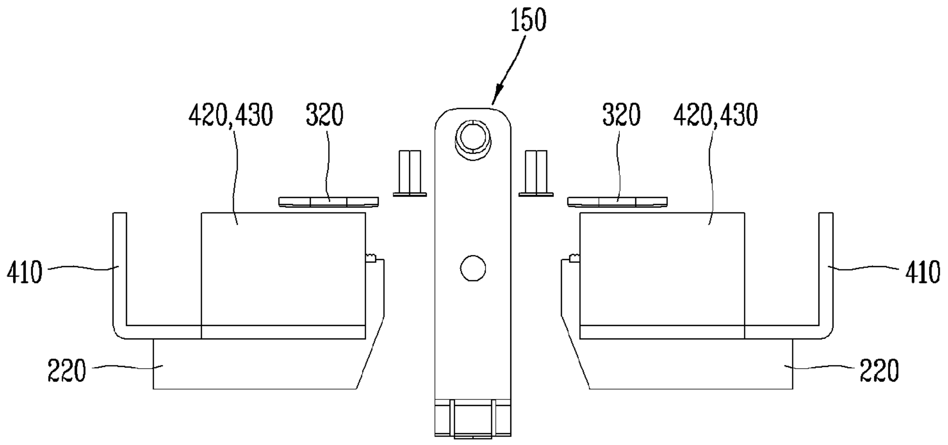
FIG. 14 is a lateral view illustrating the fixed contactor part, the movable contactor part, and the arc extinguishing part of FIG. 7.

The elastic portion 140 may be supported by the support portion 150 (see FIG. 7). Specifically, the elastic portion 140 may be accommodated in a space defined inside the support portion 150. A protrusion may be formed on a lower surface of the support portion 150, and the elastic portion 140 may be fitted onto the protrusion.

The elastic portion 140 may be provided in plurality. The plurality of elastic portions 140 may be provided for the fixed contactor part 200, the movable contactor part 300, and the arc extinguishing part 400, respectively.

In the illustrated implementation, the elastic portions 140 may be totally three in number. This may result from that three-phase currents of R-phase, S-phase and T-phase flow in the magnetic contactor 10.

The support portion 150 may movably support the crossbar 310. The crossbar 310 may be accommodated in a space defined inside the support portion 150.

In addition, the support portion 150 may support the elastic portion 140. The elastic portion 140 may be accommodated in the space defined inside the support portion 150.

In the inner space of the support portion 150, the crossbar 310 may be located between a bar member disposed on an upper side of the support portion 150 and the elastic portion 140. The bar member may prevent the crossbar 310 from moving upward. That is, in a state in which the movable core 160 is not moved, an upper surface of the crossbar 310 may be in contact with the bar member.

When the movable core 160 is moved, the crossbar 310 may compress the elastic portion 140 and move downward in the direction toward a fixed contactor 230, namely, downward in the illustrated implementation.

When the fixed core 180 does not apply the magnetic attraction to the movable core 160, the crossbar 310 may move away from the fixed contactor 230, namely, upward in the illustrated implementation, by the elastic portion 140.

The support portion 150 may be provided in plurality. The plurality of support portions 150 may be provided for each of the fixed contactor part 200, the movable contactor part 300, and the arc extinguishing part 400, respectively.

The movable core 160 may be moved toward the fixed core 180 by the magnetic attraction that the fixed core 180 applies. Also, when the fixed core 180 is demagnetized, the movable core 160 may be moved away from the fixed core 180.

By the movement of the movable core 160, the electric connection between the inside and the outside of the magnetic contactor 10 may be made or released.

The movable core 160 may be implemented as any member or component to be moved by magnetic attraction. In one implementation, the movable core 160 may be implemented as a conductor, an electromagnet, or a permanent magnet.

The movable core 160 may be connected to the crossbar 310. When the movable core 160 is moved, the crossbar 310 may also be moved together with the movable core 160.

The movable core 160 may be spaced apart from the fixed core 180 by a predetermined distance. The predetermined distance may be defined as a distance by which the movable core 160 needs to move in order to come into contact with the fixed core 180. Also, the predetermined distance may be defined as a distance by which a movable contactor 320 needs to move in order to come into contact with the fixed contactor 230.

In the illustrated implementation, the movable core 160 may be located above the fixed core 180. The fixed contactor part 200 may be located between the movable core 160 and the crossbar 310.

The coil 170 may be located below the movable core 160.

The coil 170 may generate a magnetic field as a current is applied. The magnetic field generated by the coil 170 may magnetize the fixed core 180. The magnetized fixed core 180 may apply magnetic attraction to the movable core 160, so that the movable core 160 can be moved toward the fixed core 180.

The coil 170 may be electrically connected to the outside of the magnetic contactor 10. A current or an electrical signal applied from an external power source may be transmitted to the coil 170.

The coil 170 may be located adjacent to the fixed core 180. In the illustrated implementation, the coil 170 may be located below the fixed core 180. The coil 170 may be disposed at any position at which it can generate a magnetic field to the fixed core 180.

The coil 170 may be implemented as any component or member capable of generating a magnetic field as a current is applied.

The fixed core 180 may be magnetized by the magnetic field generated by the coil 170 so as to apply the magnetic attraction to the movable core 160.

The fixed core 180 may be located between the movable core 160 and the coil 170. Accordingly, the distance between the fixed core 180 and the movable core 160 can be reduced, such that the magnetic attraction exerted between the cores 160 and 180 can be increased. This can result in reducing a size of the coil 170 that generates the magnetic field to move the movable core 160.

The fixed core 180 may be implemented as any member or component capable of being magnetized by the magnetic field. In one implementation, the fixed core 180 may be implemented as an electromagnet.

(2) Description of Fixed Contactor Part 200

Figure 4:
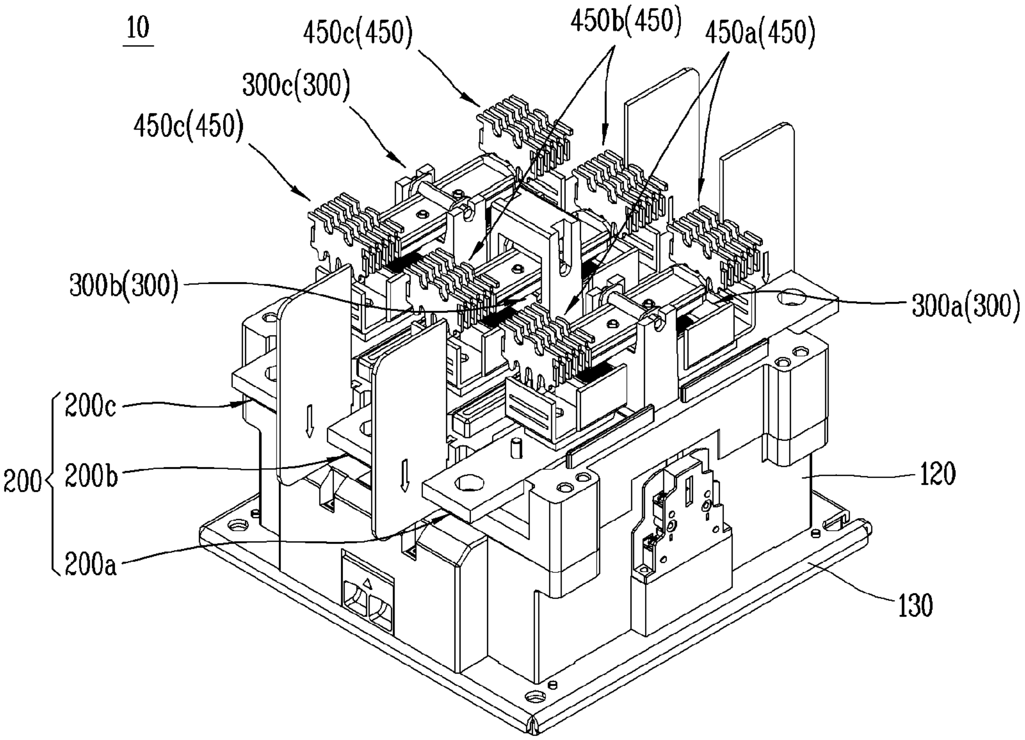
FIG. 4 is a perspective view illustrating a state in which an arc box part is detached from the magnetic contactor of FIG. 1.
Figure 5:
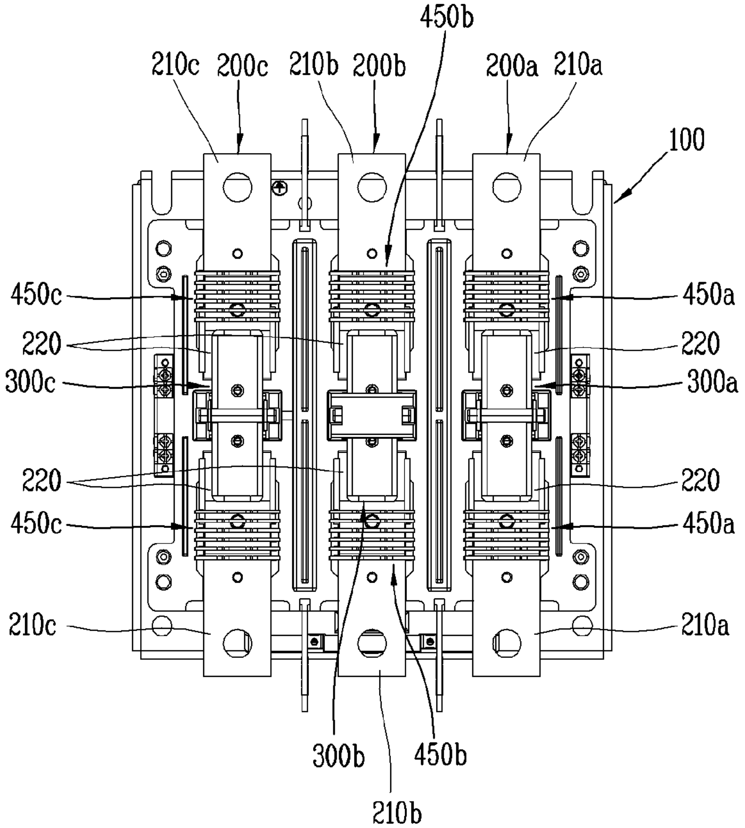
FIG. 5 is a planar view illustrating the state in which the arc box part is detached from the magnetic contactor of FIG. 1.
Figure 6:
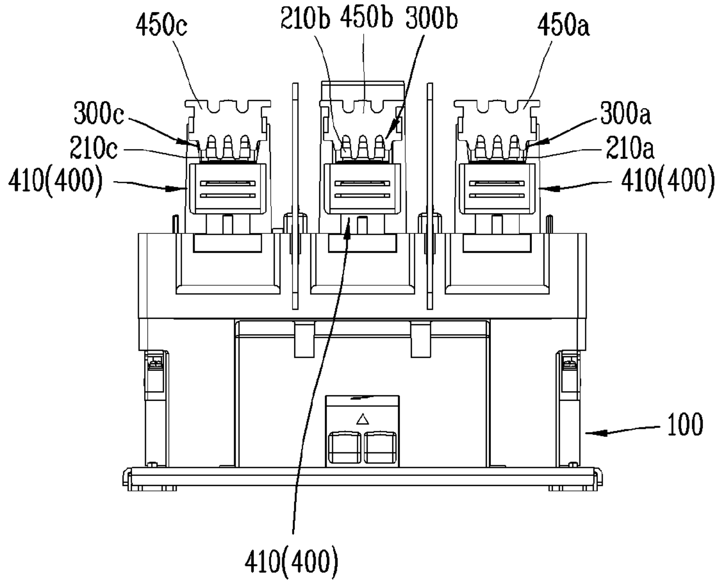
FIG. 6 is a front view illustrating the state in which the arc box part is detached from the magnetic contactor of FIG. 1.

Referring to FIGS. 4 to 6, the magnetic contactor 10 according to the implementation may include the fixed contactor part 200.

The fixed contactor part 200 may be electrically connected to the movable contactor part 300. Specifically, the movable contactor part 300 may be moved toward the fixed contactor part 200 as a current is applied to the coil 170, such that the fixed contactor 230 and the movable contactor 320 can be brought into contact with each other. Accordingly, the fixed contactor part 200 and the movable contactor part 300 can be electrically connected to each other.

As the name implies, the fixed contactor part 200 may not move. That is, the fixed contactor part 200 may be fixedly installed on the frame part 100. In one implementation, the fixed contactor part 200 may be fixed onto the lower frame 120.

The fixed contactor part 200 may be accommodated in a space defined inside the arc box part 500, that is, in a space portion 530.

The fixed contactor part 200 may be provided in plurality. In the illustrated implementation, the fixed contactor part 200 may be provided by three, namely, a first fixed contactor part 200*a*, a second fixed contactor part 200*c*, and a third fixed contactor part 200*c*. This may correspond to the three-phase currents of R-phase, S-phase, and T-phase, as described above.

The first fixed contactor part 200*a*, the second fixed contactor part 200*b*, and the third fixed contactor part 200*c* may be located at predetermined distances from one another in a widthwise direction, namely, in left and right directions in the illustrated implementation. Partitions 520 may be disposed between the fixed contactor parts 200*a*, 200*b*, and 200*c* adjacent to each other.

The first fixed contactor part 200*a* may be located on the leftmost side. The first fixed contactor part 200*a* may be accommodated in a first space portion 530*a*.

The second fixed contactor part 200*b* may be located between the first fixed contactor part 200*a* and the third fixed contactor part 200*c*. The second fixed contactor part 200*b* may be accommodated in the second space portion 530*b*.

The third fixed contactor part 200*c* may be located on the rightmost side. The third fixed contactor part 200*c* may be accommodated in the third space portion 530*c*.

The first to third fixed contactor parts 200*a*, 200*b*, and 200*c* may be spaced apart from one another by predetermined distances. The first to third fixed contactor parts 200*a*, 200*b*, and 200*c* may be physically spaced apart from one another by the partitions 520.

The first to third fixed contactor parts 200*a*, 200*b*, and 200*c* may have the same structure and components except for the arrangement method described above. Thus, in the following description, the first to third fixed contactor parts 200*a*, 200*b*, and 200*c* will be collectively referred to as the fixed contactor part 200.

The fixed contactor part 200 may include a terminal 210, a fixed contactor support 220, and a fixed contactor 230.

The terminal 210 may be a portion where the fixed contactor part 200 is electrically connected to an external power source and a load. The terminal 210 may protrude to the outside of the frame part 100 by a predetermined length. That is, the terminal 210 may be partially exposed to the outside of the frame part 100.

A power source or a load may be connected to the terminal 210.

In the illustrated implementation, the terminal 210 may be located on each of a front side and a rear side of the fixed contactor part 200. When the fixed contactor 230 and the movable contactor 320 come into contact with each other, the terminals 210 disposed on the front and rear sides of the fixed contactor part 200 may be electrically connected to each other.

Accordingly, the power source and the load respectively connected to the front and rear terminals 210 can be electrically connected to each other.

The terminals 210 may be provided in each of the fixed contactor parts 200*a*, 200*b*, and 200*c*, respectively. That is, the terminals 210 may include first terminals 210*a*, second terminals 210*b*, and third terminals 210*c*.

The first terminals 210*a* may be disposed in the first fixed contactor part 200*a* and the second terminals 210*c* may be disposed in the second fixed contactor part 200*b*. Similarly, the third terminals 210*c* may be disposed in the third fixed contactor part 200*c*.

The terminals 210 may be electrically connected to the fixed contactor supports 220, respectively. Also, the terminals 210 may be electrically connected to the fixed contactors 230, respectively. The electrical connection may be made by the fixed contactor support 220 that is electrically connected to the terminal 210 and the fixed contactor 230.

The fixed contactor support 220 may be electrically connected to the fixed contactor 230. The fixed contactor support 220 may support the fixed contactor 230 under the fixed contactor 230.

The fixed contactor support 220 may be provided in plurality. The plurality of fixed contactor supports 220 may be disposed respectively on the front side and the rear side of the fixed contactor part 200.

The fixed contactor support 220 disposed on the front side may be electrically connected to the terminal 210 and the fixed contactor 230 disposed on the front side. The fixed contactor support 220 disposed on the rear side may be electrically connected to the terminal 210 and the fixed contactor 230 disposed on the rear side.

First to third wall portions 410, 420, and 430 of the arc extinguishing part 400 to be described later may be located on each fixed contactor support 220. A detailed description thereof will be given later.

The fixed contactor 230 may be electrically connected to the fixed contactor support 220. The fixed contactor 230 may be located on an upper side of the fixed contactor support 220. The fixed contactor 230 may be mounted on the fixed contactor support 220.

The fixed contactor 230 may be brought into contact with or separated from the movable contactor 320 to be electrically connected or disconnected. In a state in which the movable core 160 is not moved, the fixed contactor 230 may be spaced apart from the movable contactor 320 by a predetermined distance. When the movable core 160 is moved, the movable contactor 320 may be brought into contact with the fixed contactor 230.

When the fixed contactor 230 is in contact with the movable contactor 320, the terminal 210, the fixed contactor support 220, the fixed contactor 230, the movable contactor 320, and the arc extinguishing part 310 may all be electrically connected.

The fixed contactor 230 may not move. Accordingly, the contact between the fixed contactor 230 and the movable contactor 320 can be achieved by the movement of the movable contactor 320.

The fixed contactor 230 may be formed of a material on which a current can flow. Also, the fixed contactor 230 may be formed of a material with high heat resistance and wear resistance. This can prevent damage on the fixed contactor 230 due to an arc generated when the fixed contactor 230 and the movable contactor 320 are separated from each other.

The fixed contactor 230 may be provided in plurality. The plurality of fixed contactors 230 may be located respectively on the front side and the rear side of the fixed contactor part 200. The fixed contactor 230 located on the front side may be electrically connected to the fixed contactor support 220 located on the front side. The fixed contactor 230 located on the rear side may be electrically connected to the fixed contactor support 220 located on the rear side.

Each fixed contactor 230 may be surrounded by first to third wall portions 410, 420, and 430.

Accordingly, the arc generated when the fixed contactor 230 and the movable contactor 320 are separated from each other may not arbitrarily move to an inner space of the arc box part 500. Also, the generated arc may extend in a direction toward the grid 450. A detailed description thereof will be given later.

(3) Description of Movable Contactor Part 300

Referring to FIGS. 4 to 6, the magnetic contactor 10 according to the implementation may include the movable contactor part 300.

The movable contactor part 300 may be electrically connected to the fixed contactor part 200. When the magnetized fixed core 180 applies the magnetic attraction to the movable core 160, the movable contactor part 300 may move toward the fixed contactor part 200 together with the movable core 160. Accordingly, the movable contactor 320 and the fixed contactor 230 can be brought into contact with each other so as to be electrically connected.

The movable contactor part 300 may be movably accommodated in the space defined in the arc box part 500. Specifically, the movable contactor part 300 may be accommodated in the space portion 530. The movable contactor part 300 may move toward the fixed contactor part 200 and away from the fixed contactor part 200.

The movable contactor part 300 may be provided in plurality. In the illustrated implementation, the movable contactor part 300 may be provided by three, namely, a first movable contactor part 300*a*, a second movable contactor part 300*c*, and a third movable contactor part 200*c*. This may correspond to the three-phase currents of the R-phase, S-phase, and T-phase, as described above.

The first movable contactor part 300*a*, the second movable contactor part 300*b*, and the third movable contactor part 300*c* may be located at predetermined distances from one another in a widthwise direction, namely, in left and right directions in the illustrated implementation. Partitions 520 may be disposed between the movable contactor parts 300*a*, 300*b*, and 300*c* adjacent to each other.

The first movable contactor part 300*a* may be located on the leftmost side. The first movable contactor part 300*a* may be accommodated in the first space portion 530*a* to be movable up and down.

The second movable contactor part 300*b* may be located between the first movable contactor part 300*a* and the third movable contactor part 300*c*. The second movable contactor part 300*b* may be accommodated in the second space portion 530*b* to be movable up and down.

The third movable contactor part 300*c* may be located on the rightmost side. The third movable contactor part 300*c* may be accommodated in the third space portion 500*c* to be movable up and down.

The first to third movable contactor parts 300*a*, 300*b*, and 300*c* may be spaced apart from one another by predetermined distances. The first to third movable contactor parts 300*a*, 300*b*, and 300*c* may be physically spaced apart from one another by the partitions 520.

The first to third movable contactor parts 300*a*, 300*b*, and 300*c* may have the same structure and components except for the arrangement method described above. Thus, in the following description, the first to third movable contactor parts 300*a*, 300*b*, and 300*c* will be collectively referred to as the movable contactor part 300.

The movable contactor part 300 may include a crossbar 310 and a movable contactor 320.

The crossbar 310 may move toward or away from the fixed contactor part 200, in response to the movement of the movable core 160. The crossbar 310 may be connected to the movable core 160 to be movable together with the movable core 160.

The crossbar 310 may be movably accommodated in a space defined in the support portion 150. A bar member of the support portion 150 may be located above the crossbar 310. The elastic portion 140 may be located below the crossbar 310. The crossbar 310 may be elastically supported by the elastic portion 140.

The crossbar 310 may extend in one direction, namely, in front and rear directions in the illustrated implementation. An extension length of the crossbar 310 may preferably be longer than a spaced distance between the plurality of fixed contactors 230 provided in the fixed contactor part 200.

The crossbar 310 may be formed of a material on which a current can flow. Accordingly, the fixed contactor part 200 and the movable contactor part 300 can be electrically connected to each other.

The grids 450 may be located at an upper side of the crossbar 310. The grids 450 may be located adjacent to both ends of the crossbar 310 in the extending direction, namely, in the one direction.

The crossbar 310 may be electrically connected to the movable contactor 320. The movable contactor 320 may be disposed at one side of the crossbar 310 facing the fixed contactor part 200, namely, at the lower side of the crossbar 310 in the illustrated implementation.

The movable contactor 320 may be electrically connected to the crossbar 310. The movable contactor 320 may be disposed at the lower side of the crossbar 310.

The movable contactor 320 may be brought into contact with or separated from the fixed contactor 230 to be electrically connected or disconnected. In a state in which the movable core 160 is not moved, the movable contactor 320 may be spaced apart from the fixed contactor 230 by a predetermined distance.

When the movable core 160 moves toward the fixed core 180, the crossbar 310 connected to the movable core 160 may move toward the fixed contactor part 200. Accordingly, the movable contactor 320 can move toward the fixed contactor 230 to be brought into contact with the fixed contactor 230.

When the movable contactor 320 is in contact with the fixed contactor 230, the terminal 210, the fixed contactor support 220, the fixed contactor 230, the movable contactor 320, and the arc extinguishing part 310 may all be electrically connected.

The movable contactor 320 may be formed of a material on which a current can flow. Also, the movable contactor 320 may be formed of a material with high heat resistance and wear resistance. This can prevent damage on the movable contactor 320 due to an arc generated when the fixed contactor 230 and the movable contactor 320 are separated from each other.

The movable contactor 320 may be provided in plurality. The plurality of movable contactors 320 may be located adjacent to both ends of the crossbar 310 in the extending direction, namely, in the one direction, specifically, in the front and rear directions in the illustrated implementation.

Each movable contactor 320 may be surrounded by the first to third wall portions 410, 420, and 430.

Accordingly, the arc generated when the fixed contactor 230 and the movable contactor 320 are separated from each other may not arbitrarily move to the inner space of the arc box part 500. Also, the generated arc may extend in a direction toward the grid 450. A detailed description thereof will be given later.

3. Description of Arc Extinguishing Part 400 According to Implementation

The magnetic contactor 10 according to the implementation of the present disclosure may include the arc extinguishing part 400. The arc extinguishing part 400 may be configured to effectively extinguish an arc that is generated as the fixed contactor 230 and the movable contactor 320 in contact with each other are separated from each other.

In addition, the arc extinguishing part 400 may guide the generated arc to move toward the grid 450. Accordingly, the generated arc may not move arbitrarily in the inner space of the magnetic contactor 10.

Hereinafter, an arc extinguishing part 400 according to an implementation will be described in detail, with reference to FIGS. 7 to 15. In FIGS. 7 to 15, some components will not be illustrated for convenience of description.

The arc extinguishing part 400 may be provided in plurality. The plurality of arc extinguishing parts 400 may be provided in the first to third fixed contactor parts **200*a*, 200*b*, and 200*c* and the first to third movable contactor parts 300*a*, 300*b*, and 300*c***, respectively.

In this implementation, each arc extinguishing part 400 may include a first wall portion 410, a second wall portion 420, a third wall portion 430, and a grid 450.

The first wall portion 410 may be located adjacent to the fixed contactor 230. The first wall portion 410 may partially surround the fixed contactor 230.

Specifically, the fixed contactor support 220 may extend in one direction, namely, in the front and rear directions in the illustrated implementation. The first wall portion 410 may be spaced apart from the fixed contactor 230 by a predetermined distance and located on one end portion of the fixed contactor support 220.

In other words, the first wall portion 410 may be located on the end portion of the fixed contactor support 220 in an opposite direction to the support portion 150 with the fixed contactor 230 as the center.

The first wall portion 410 may be provided in plurality. This may result from that the fixed contactor 230 is provided in plurality. In the illustrated implementation, the first wall portion 410 may be two. Each of the first wall portions 410 may be located at an end portion in a direction away from the fixed contactor 230, of longitudinal end portions of the fixed contactor support 220.

The first wall portions 410 may be disposed to face each other with the support portion 150 interposed therebetween. In one implementation, distances between the support portion 150 and the first wall portions 410 may be the same.

The first wall portion 410 may extend toward the grid 450, namely, upward in the illustrated implementation. In addition, in the illustrated implementation, the first wall portion 410 may be formed in a rectangular plate shape. The first wall portion 410 may be formed in any shape capable of guiding the flow of the generated arc toward the grid 450.

In one implementation, the first wall portion 410 may have a cross-sectional area that is reduced in a direction toward the grid 450. This may result from the fact that an arc tends to extend towards a peak.

The first wall portion 410 may be formed of a conductive material. This may be intended to form an arc flow, which is a flow of electrons.

An arc through hole 440 may be formed at the first wall portion 410. The arc through hole 440 may be formed through the first wall portion 410. The arc may flow away from the fixed contactor 230 and the movable contactor 320 through the arc through hole 440. A detailed description of the arc through hole 440 will be described later.

The second wall portion 420 may be located adjacent to the fixed contactor 230. The second wall portion 420 may partially surround the fixed contactor 230.

The second wall portion 420 may be located at a right side in the widthwise direction of the fixed contactor support 220, namely, in the left and right directions of the fixed contactor 230 in the illustrated implementation. Alternatively, the second wall portion 420 may be located at the left side of the fixed contactor 230.

The second wall portion 420 may be provided in plurality. In the illustrated implementation, the second wall portion 420 may be two. The second wall portions 420 may be located at the left sides of the fixed contactors 230, respectively.

Each of the second wall portions 420 may be disposed to face the third wall portion 430 with the fixed contactor 230 interposed therebetween. In one implementation, the shortest distance between the second wall portion 420 and the fixed contactor 230 may be equal to the shortest distance between the third wall portion 430 and the fixed contactor 230.

The second wall portion 420 may extend toward the grid 450, namely, upward in the illustrated implementation. In addition, in the illustrated implementation, the second wall portion 420 may be formed in a rectangular plate shape. The second wall portion 420 may be formed in any shape capable of guiding the flow of the generated arc toward the grid 450.

In one implementation, the second wall portion 420 may have a cross-sectional area that is reduced in a direction toward the grid 450. This may result from the fact that an arc tends to extend towards a peak. The second wall portion 420 may be formed in a shape corresponding to the third wall portion 430.

The second wall portion 420 may be formed of a conductive material. This may be intended to form an arc flow, which is a flow of electrons.

The third wall portion 430 may be located adjacent to the fixed contactor 230. The third wall portion 430 may partially surround the fixed contactor 230.

The third wall portion 430 may be located at a left side in the widthwise direction of the fixed contactor support 220, namely, in the left and right directions of the fixed contactor 230 in the illustrated implementation. Alternatively, the third wall portion 430 may be located at the right side of the fixed contactor 230.

The third wall portion 430 may be provided in plurality. In the illustrated implementation, the third wall portion 430 may be two. The third wall portions 430 may be located at the right sides of the fixed contactors 230, respectively.

Each of the third wall portions 430 may be disposed to face the second wall portion 420 with the fixed contactor 230 interposed therebetween. In one implementation, the shortest distance between the third wall portion 430 and the fixed contactor 230 may be equal to the shortest distance between the second wall portion 420 and the fixed contactor 230.

The third wall portion 430 may extend toward the grid 450, namely, upward in the illustrated implementation.

The third wall portion 430 may extend toward the grid 450, namely, upward in the illustrated implementation. In addition, in the illustrated implementation, the third wall portion 430 may be formed in a rectangular plate shape. The third wall portion 430 may be formed in any shape capable of guiding the flow of the generated arc toward the grid 450.

In one implementation, the third wall portion 430 may have a cross-sectional area that is reduced in a direction toward the grid 450. This may result from the fact that an arc tends to extend towards a peak. The third wall portion 430 may be formed in a shape corresponding to the second wall portion 420.

The third wall portion 430 may be formed of a conductive material. This may be intended to form an arc flow, which is a flow of electrons.

The arc through hole 440 may function as a passage through which the generated arc is extinguished and discharged.

The arc generated when the fixed contactor 230 and the movable contactor 320 are separated from each other may pass through the arc through hole 440 so as to be discharged to the outside of the magnetic contactor 10 through an arc outlet 540, 550 of the arc box part 500 to be described later.

The arc through hole 440 may be formed through the first wall portion 410. In another implementation, the arc through hole 440 may also be formed at the second wall portion 420 or the third wall portion 430.

The arc through hole 440 may be provided in plurality. In the illustrated implementation, two arc through holes 440 may be provided but the number may vary.

The arc through hole 440 may be formed in various shapes. The arc through hole 440 may extend at a predetermined angle with the extending direction of the crossbar 310.

In one implementation, the arc through hole 440 may extend in the widthwise direction of the first wall portion 410, namely, in the left and right directions in the illustrated implementation.

Figure 15:
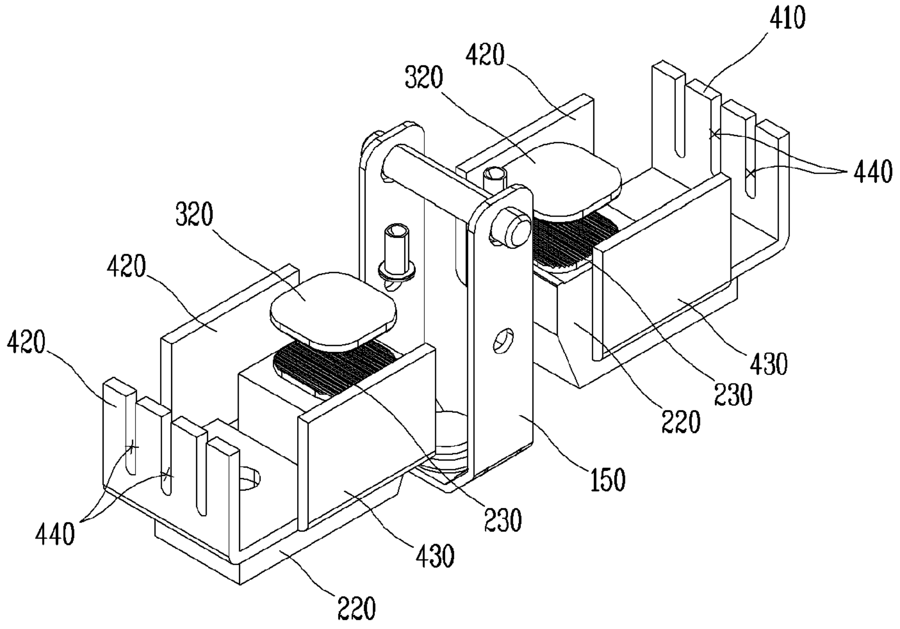
FIG. 15 is a perspective view illustrating an arc through hole formed through an arc extinguishing part in accordance with another implementation.
Figure 16:
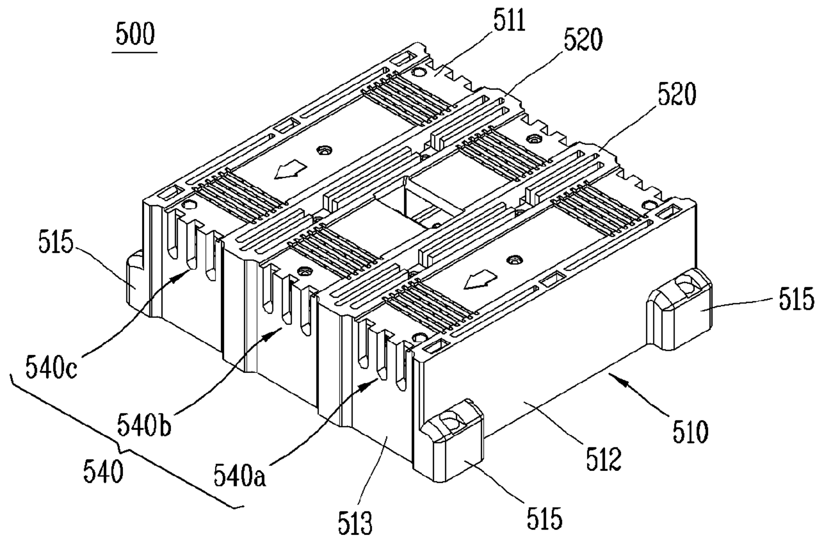
FIG. 16 is a perspective view illustrating an arc box part provided in a magnetic contactor in accordance with an implementation.
Figure 17:
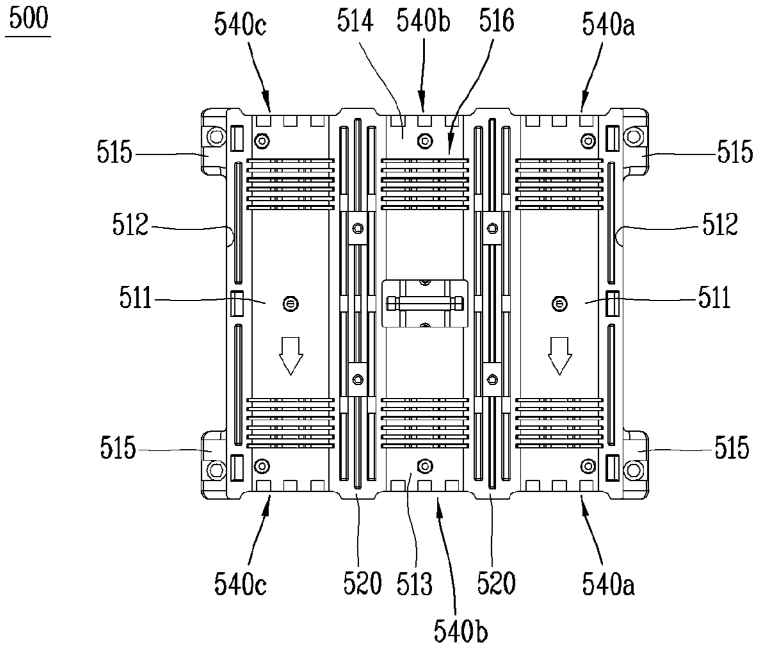
FIG. 17 is a planar view illustrating the arc box part of FIG. 16.
Figure 18:
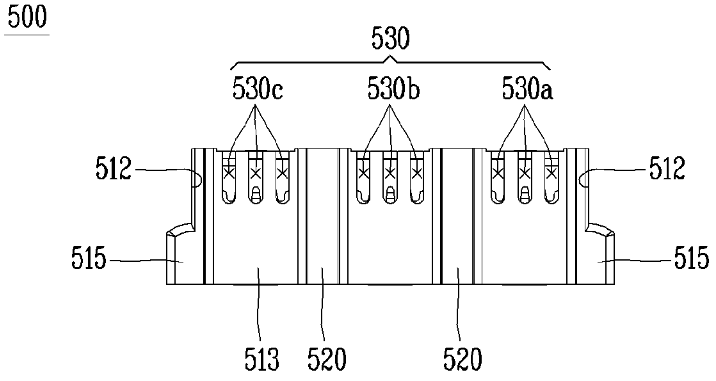
FIG. 18 is a front view illustrating the arc box part of FIG. 16.
Figure 19:
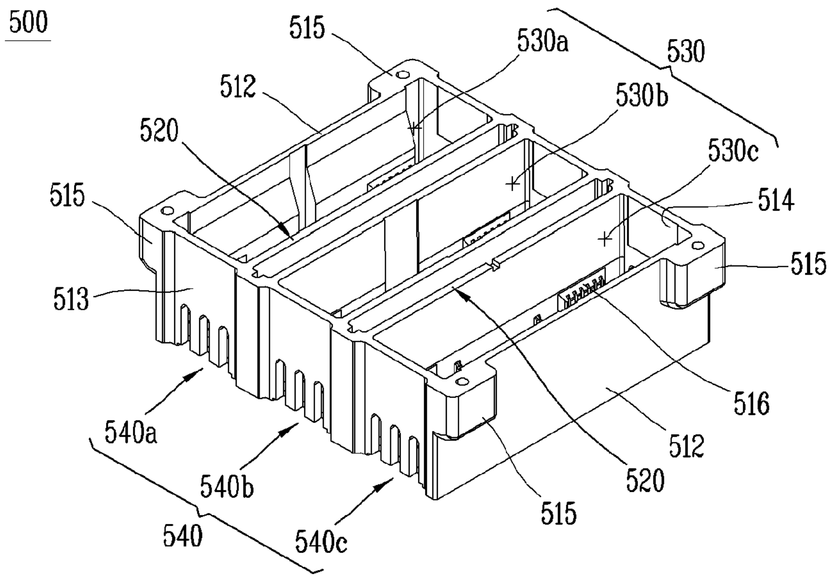
FIG. 19 is a perspective view illustrating the arc box part of FIG. 16 at a different angle.

In the implementation illustrated in FIG. 15, the arc through holes 440 may extend in a height-wise direction of the first wall portion 410, namely, in up and down directions. In the implementation, upper ends of the arc through holes 440 may be open. That is, an upper edge of the first wall portion 410 through which the arc through holes 440 are formed may be open.

In this implementation, the arc can pass through the arc through holes 440. Furthermore, the arc can more effectively extend toward the grid 450 by the peaks formed between the adjacent arc through holes 440.

When the arc box part 500 is coupled, the arc through holes 440 may be located adjacent to the arc outlet 540, 550 of the arc box part 500. Accordingly, the arc passing through the arc through holes 440 may be discharged to the outside of the magnetic contactor 10 through the arc outlet 540, 550 without flowing through the inner space of the magnetic contactor 10.

The grid 450 may extinguish and discharge the arc generated when the fixed contactor 230 and the movable contactor 320 are separated from each other. The grid 450 may include a plurality of plate members. The plurality of plate members may be spaced apart from one another by predetermined distances. In the illustrated implementation, each grid 450 may include six plate members but the number may vary.

Each of the grids 450 may be located adjacent to the fixed contactor 230 and the movable contactor 320. That is, the grids 450 may include a first grid 450*a* located at the leftmost side, a second grid 450*b* located at the center, and a third grid 450*c* located at the rightmost side.

The first grid 450*a* may be located adjacent to the first fixed contactor part 200*a*. The first grid 450*a* may be accommodated in the first space portion 530*a*.

The second grid 450*b* may be located adjacent to the second fixed contactor part 200*b*. The second grid 450*b* may be accommodated in the second space portion 530*b*.

The third grid 450*c* may be located adjacent to the third fixed contactor part 200*c*. The third grid 450*c* may be accommodated in the third space portion 530*c*.

The first to third grids 450*c* may be different in arrangement position but have the same structure and components. Therefore, in the following description, the first to third grids 450*a*, 450*b*, and 450*c* will be collectively referred to as the grid 450.

The grid 450 may be located in a direction away from the crossbar 310, namely, upward in the illustrated implementation. In other words, the arc extinguishing part 310 may be located between the grid 450 and the fixed contactor 230 or the movable contactor 320.

The plurality of plate members may be formed of a magnetic material. The generated arc may be moved toward the plurality of plate members constituting the grid 450. The arc may also be introduced into spaces defined as the plurality of plate members are spaced apart from one another. The arc may be divided into short arcs and a voltage may be increased.

Through the process, the arc can be moved up to one side of the grid 450 opposite to the crossbar 310, namely, up to the upper side of the grid 450 in the illustrated implementation. The one side of the grid 450 may be located adjacent to the arc outlet 540, 550 of the arc box part 500.

Accordingly, the arc moved up to the upper end of the grid 450 can be discharged to the outside of the magnetic contactor 10 through the arc outlet 540, 550.

In the illustrated implementation, the grid 450 may be provided in plurality. The plurality of grids 450 may be respectively disposed adjacent to the fixed contactors 230. In one implementation, each grid 450 may be located between the fixed contactor 230 and the first wall portion 410.

The plurality of plate members may be formed in various shapes. In the illustrated implementation, the plurality of plate members may include a plurality of concave portions and convex portions on one side (lower side) thereof facing the fixed contactor 230 or the movable contactor 320. Accordingly, the generated arc can effectively extend toward the grid 450.

4. Description of Arc Box Part 500 According to Implementation

The magnetic contactor 10 according to the implementation may include the arc box part 500. Hereinafter, a detailed description will be given of the arc box part 500 according to one implementation, with reference to FIGS. 16 to 20.

The arc box part 500 may be located between the upper frame 110 and the lower frame 120. The arc box part 500 may define a part of appearance of the magnetic contactor 10.

The arc box part 500 may be coupled to the upper frame 110 and the lower frame 120. The magnetic contactor 10 may be sealed by the frame part 100 and the arc box part 500, except for the arc outlet 540, 550. Accordingly, the generated arc may not leak to the outside of the magnetic contactor 10 through an arbitrary path.

The arc box part 500 may be formed of an insulating material. This can prevent an arbitrary electrical connection between inside and outside of the magnetic contactor 10.

In addition, the arc box part 500 may be formed of a material having a light weight and high heat resistance and rigidity. This can prevent damage on the arc box part 500 due to the high-temperature and high-pressure arc generated inside. In one implementation, the arc box part 500 may be formed of reinforced plastic.

A predetermined space may be defined inside the arc box part 500. The fixed contactor part 200, the movable contactor part 300, and the arc extinguishing part 400 may be accommodated in the space. The space may communicate with a space defined inside the lower frame 120.

In the illustrated implementation, the arc box part 500 may be formed in a rectangular pillar shape having a rectangular cross-section. The shape of the arc box part 500 may vary depending on shapes of the upper frame 110 and the lower frame 120.

The arc box part 500 may include a body portion 510, a partition 520, a space portion 530, an arc outlet 540, 550, and a mesh portion 560.

The body portion 510 may define a body of the arc box part 500. The body portion 510 may be formed to correspond to the shapes of the upper frame 110 and the lower frame 120.

A predetermined space may be defined inside the body portion 510. The space may be divided into a plurality of space portions 530 by the partition 520.

The body portion 510 may include an upper surface 511, side surfaces 512, a front surface 513, a rear surface 514, a coupling portion 515, and a grid insertion portion 516.

The upper surface 511 may define a top surface of the body portion 510. The upper surface 511 may cover the space defined inside the body portion 510 from the upper side. The upper frame 110 may be mounted on the upper surface 511.

The side surfaces 512 may define surfaces of the body portion 510 in the widthwise direction, namely, in the left and right directions in the illustrated implementation. That is, the side surfaces 512 may include a left surface and a right surface. The coupling portion 515 may be located on each longitudinal end portion of the side surface 512, namely, on each end portion in the front and rear directions in the illustrated implementation. The side surfaces 512 may face each other. The side surfaces 512 may be symmetrical with each other.

The front surface 513 may define a surface on one longitudinal side of the body portion 510, namely, on the front side in the illustrated implementation. The front surface 513 may face the rear surface 514.

The partition 520 may partially protrude from the front surface 513. In the illustrated implementation, two partitions 520 may partially protrude from the front surface 513 with being spaced apart from each other by a predetermined distance. Accordingly, the front surface 513 may be divided into three surfaces.

The arc outlet 540, 550 may be formed through the front surface 513. As described above, the front surface 513 may be divided into the plurality of surfaces by the partitions 520. The arc outlet 540, 550 may be formed through each divided surface of the front surface 513.

The rear surface 514 may define a surface on another longitudinal side of the body portion 510, namely, on the rear side in the illustrated implementation. The rear surface 514 may face the front surface 513.

The partition 520 may partially protrude from the rear surface 514. In the illustrated implementation, the two partitions 520 may partially protrude from the rear surface 514 with being spaced apart from each other by a predetermined distance. Accordingly, the ear surface 514 may be divided into three surfaces.

The arc outlet 540, 550 may be formed through the rear surface 514. As described above, the rear surface 514 may be divided into the plurality of surfaces by the partitions 520. The arc outlet 540, 550 may be formed through each divided surface of the rear surface 514.

The front surface 513 and the rear surface 514 may be symmetrical with each other.

The coupling portion 515 may be a portion where the arc box part 500 is coupled to the lower frame 120. The coupling portion 515 may be located in the longitudinal direction of each side surface 512, namely, on each of front and rear end portions in the illustrated implementation.

The coupling portion 515 may be provided in plurality. In the illustrated implementation, totally four coupling portions 515 may be disposed on front and rear end portions of each of the side surfaces 512. The positions and number of the coupling portions 5154 may vary to correspond to the shape of the lower frame 120.

A through hole may be formed through each coupling portion 515. A coupling member (not shown) may be inserted into the through hole.

The grid 450 may be inserted into the grid insertion portion 516. Accordingly, even when an arc is generated, the grid 450 can be stably maintained in a state coupled to the arc box part 500.

The grid insertion portion 516 may be recessed by a predetermined length. The grid insertion portion 516 may be recessed in inner sides of the upper surface 511 and the side surfaces 512 and the partitions 520.

The grid insertion portion 516 may include a plurality of grooves. The plurality of grooves may be spaced apart from one another by predetermined distances. The predetermined distances by which the plurality of grooves are spaced apart from one another may be equal to the predetermined distances by which the plurality of plate members constituting the grid 450 are spaced apart from one another.

In the illustrated implementation, the upper surface 511 may be divided into three surfaces by the partitions 520. The grid insertion portions 516 are respectively formed on the three divided surfaces. On each of the three surfaces, the grid insertion portions 516 may be formed in the longitudinal direction, namely, on the front side and the rear side in the illustrated implementation. This may be determined depending on an arrangement method of the grid 450.

The partitions 520 may divide the inner space of the arc box part 500, namely, the space portion 530. The partitions 520 may divide the space portion 530 into a first space portion 530*a*, a second space portion 530*b*, and a third space portion 530*c* which are independent spaces apart from one another.

The partitions 520 may extend in the longitudinal direction of the arc box part 500, namely, in the front and rear directions in the illustrated implementation.

Upper sides of the partitions 520 may partially protrude from the upper surface 511. Accordingly, the upper surface 511 may also be divided into three surfaces.

Front sides of the partitions 520 may partially protrude to the front surface 513. Accordingly, the front surface 513 may also be divided into three surfaces.

Rear sides of the partitions 520 may partially protrude to the rear surface 514. Accordingly, the rear surface 514 may also be divided into three surfaces.

The partitions 520 may partially surround each of the space portions 530*a*, 530*b*, and 530*c*, and may include surfaces facing each other and a space defined therebetween. The space may be defined as the surfaces facing each other are spaced apart from each other.

The space may be configured to buffer pressure or impact generated together with an arc in each of the space portions 530*a*, 530*b*, and 530*c*. In addition, a total weight of the arc box part 500 can be reduced by the space.

The partition 520 may be provided in plurality. The plurality of partitions 520 may be spaced apart from each other in the widthwise direction of the arc box part 500, namely, in the left and right directions in the illustrated implementation. Accordingly, the second space portion 530*b* may be defined.

The partitions 520 may be spaced apart from the side surfaces by predetermined distances. Accordingly, the first space portion 530*a* and the third space portion 530*c* may be defined.

In one implementation, the predetermined distances by which the plurality of partitions 520 are spaced apart from one another may be equal to the predetermined distances between the partitions 520 and the side surfaces 512. In the implementation, each of the space portions 530*a*, 530*b*, and 530*c* may have a different width (widths in the left and right directions).

The space portion 530 may be a space defined inside the arc box part 500. The space portion 530 may be defined by being surrounded by the upper surface 511, the side surfaces 512, the front surface 513, and the rear surface 514.

The space portion 530 may communicate with a space defined inside the lower frame 120. Accordingly, the movable core 160 may move toward the fixed core 180 and away from the fixed core 180.

The fixed contactor part 200, the movable contactor part 300, and the arc extinguishing part 400 may be accommodated in the space portion 530.

The space portion 530 may be divided into a plurality of spaces by the partitions 520. In the illustrated implementation, the two partitions 520 may be disposed with being spaced apart from each other in the space portion 530. Accordingly, the space portion 530 may be divided into the first space portion 530*a*, the second space portion 530*b*, and the third space portion 530*c*.

The first fixed contactor part 200*a*, the first movable contactor part 300*a*, and the arc extinguishing part 400 provided therein may be located in the first space portion 530*a*.

The second fixed contactor part 200*b*, the second movable contactor part 300*b*, and the arc extinguishing part 400 provided therein may be located in the second space portion 530*b*.

The third fixed contactor part 200*c*, the third movable contactor part 300*c*, and the arc extinguishing part 400 provided therein may be located in the third space portion 530*c*.

The space portion 530 may communicate with the outside of the magnetic contactor 10. The communication may be achieved by the arc outlet 540, 550.

The arc outlet 540, 550 may be formed through the body portion 510. The arc outlet 540, 550 may communicate with the space portion 530 and the outside of the magnetic contactor 10. When the arc extinguishing part 400 is accommodated in the space portion 530, the grid 450 may be located adjacent to the arc outlet 540, 550.

Accordingly, the arc extending along the grid 450 can be discharged to the outside of the magnetic contactor 10 through the arc outlet 540, 550.

The arc outlet 540, 550 may be formed through each of the front surface 513 and the rear surface 514. Also, the arc outlet 540, 550 may be provided in plurality at each of the front surface 513 and the rear surface 514.

Specifically, as described above, the front surface 513 may be divided into the plurality of surfaces by the partitions 520. In the illustrated implementation, the front surface 513 may be divided into three surfaces located on the left side, the center, and the right side. The three surfaces may surround the front sides of the first to third space portions 530*a*, 530*b*, and 530*c*, respectively.

The arc outlets 540, 550 formed through the front surface 513 may be located at the three surfaces, respectively. That is, the arc outlets 540, 550 may be formed respectively at the three surfaces that are defined by dividing the front surface 513 so as to be located on the left side, the center, and the right side.

Accordingly, the first to third space portions 530*a*, 530*b*, and 530*c* may communicate with the outside of the magnetic contactor 10 by the arc outlets 540, 550 formed through the front surface 513.

Similarly, the rear surface 514 may be divided into the plurality of surfaces by the partitions 520. In the illustrated implementation, the rear surface 514 may be divided into three surfaces located on the left side, the center, and the right side. The three surfaces may surround the rear sides of the first to third space portions 530*a*, 530*b*, and 530*c*, respectively.

The arc outlets 540, 550 formed through the rear surface 514 may be located at the three surfaces, respectively. That is, the arc outlets 540, 550 may be formed respectively at the three surfaces that are defined by dividing the rear surface 514 so as to be located on the left side, the center, and the right side.

Accordingly, the first to third space portions 530*a*, 530*b*, and 530*c* may communicate with the outside of the magnetic contactor 10 by the arc outlets 540, 550 formed through the rear surface 514.

Figure 20:
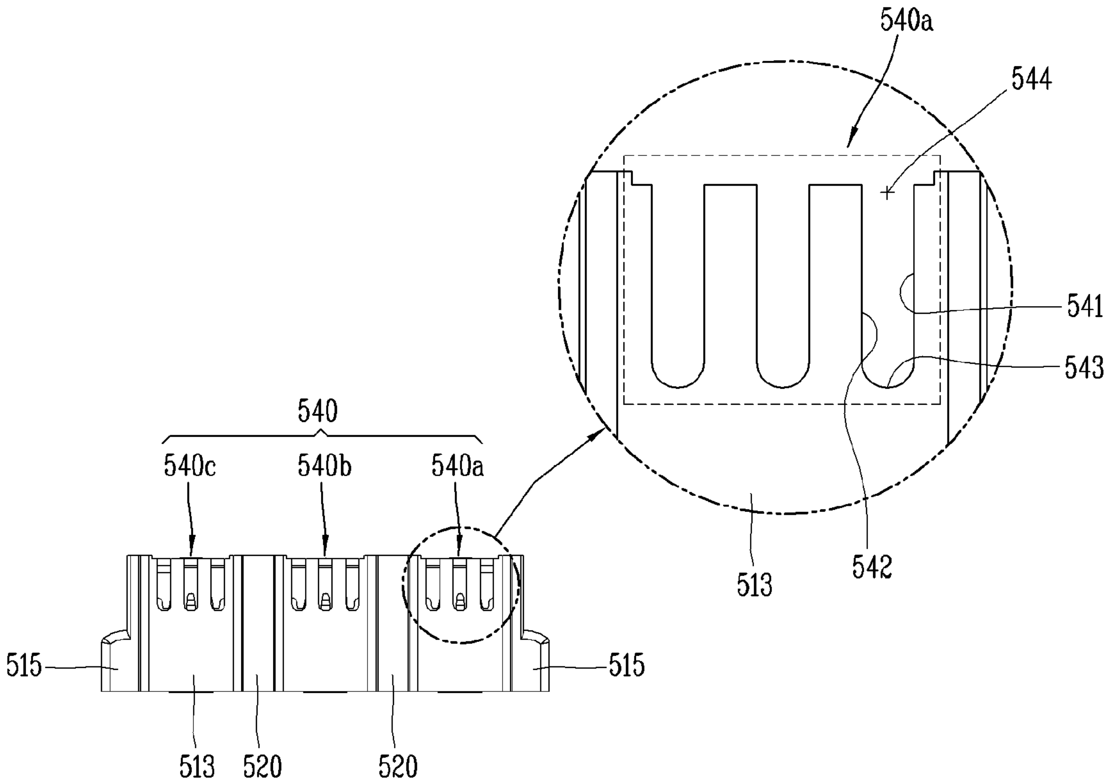
FIG. 20 is a front view illustrating an arc outlet formed at an arc box part in accordance with one implementation.

Hereinafter, the arc outlet 540 according to one implementation will be described in detail, with reference to FIG. 20.

The arc outlets 540 may be formed through the respective divided surfaces of the front surface 513 and the rear surface 514. That is, the arc outlets 540 may include a first arc outlet 540*a* located on the left side, a second arc outlet 540*b* located on the center, and a third arc outlet 540*c* located on the right side.

In addition, the arc outlet 540 may be provided in plurality for each divided surface. In the illustrated implementation, each of the first to third arc outlets 540*a*, 540*b*, and 540*c* may be provided by three for each divided surface with being spaced apart from one another by predetermined distances. The number of the arc outlets 540 formed on each divided surface may vary.

The first to third arc outlets 540*a*, 540*b*, and 540*c* may be different from one another in position to be formed but have the same structure and function. Accordingly, in the following description, the first to third arc outlets 540*a*, 540*b*, and 540*c* will be collectively referred to as the arc outlet 540.

The arc outlet 540 may extend in a direction toward the upper frame 110 and the lower frame 120, that is, in the vertical direction in the illustrated implementation. One side of the arc outlet 540 facing the upper frame 110, namely, an upper side in the illustrated implementation may be open.

In the implementation, the arc outlet 540 may include a first inner surface 541, a second inner surface 542, a third inner surface 430, and an opening 544.

The first inner surface 541 may extend by a predetermined length toward the upper frame 110 and the lower frame 120, that is, in the vertical direction in the illustrated implementation. The first inner surface 541 may face the second inner surface 542 with being spaced apart from the second inner surface 542 by a predetermined distance.

The second inner surface 542 may extend by a predetermined length toward the upper frame 110 and the lower frame 120, that is, in the vertical direction in the illustrated implementation. The second inner surface 542 may be located to face the first inner surface 541.

The first inner surface 541 and the second inner surface 542 may be symmetrical with each other.

The third inner surface 543 may extend between end portions of the first inner surface 541 and the second inner surface 542 facing the lower frame 120. That is, the third inner surface 543 may extend between lower end portions of the first inner surface 541 and the second inner surface 542. The third inner surface 543 may continuously be formed with the first inner surface 541 and the second inner surface 542.

In the illustrated implementation, the third inner surface 543 may be convex toward the lower frame 120, that is, downward. Alternatively, the third inner surface may be flat.

The third inner surface 543 may be located to face the opening 544.

The opening 544 may be open between the end portions of the first inner surface 541 and the second inner surface 542 facing the upper frame 110. That is, the opening 544 may be formed between upper end portions of the first inner surface 541 and the second inner surface 542.

The opening 544 may allow the front surface 513 and the upper surface 511 to communicate with each other. That is, the opening 544 may be formed through the front surface 513 and the upper surface 511.

In addition, the opening 544 may allow the rear surface 514 and the upper surface 511 to communicate with each other. That is, the opening 544 may be formed through the rear surface 514 and the upper surface 511.

The space portion 530 and the outside of the magnetic contactor 10 can communicate with each other by the space surrounded by the first to third inner surfaces 541, 542, and 543 and the opening 544.

Figure 21:
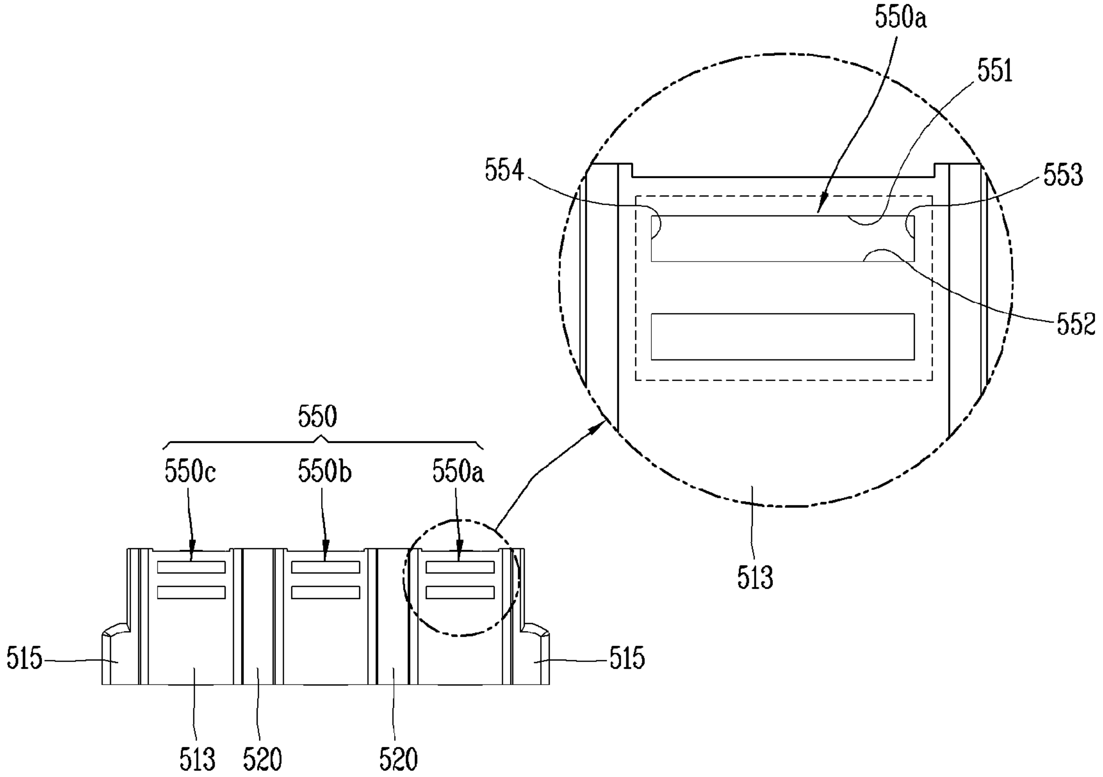
FIG. 21 is a front view illustrating an arc outlet formed at an arc box part in accordance with another implementation.

Hereinafter, an arc outlet 550 according to another implementation will be described in detail, with reference to FIG. 21.

The arc outlets 550 may be formed through the respective divided surfaces of the front surface 513 and the rear surface 514. That is, the arc outlets 550 may include a first arc outlet 550*a* located on the left side, a second arc outlet 550*b* located on the center, and a third arc outlet 550*c* located on the right side.

In addition, the arc outlet 550 may be provided in plurality for each divided surface. In the illustrated implementation, each of the first to third arc outlets 550*a*, 550*b*, and 550*c* may be provided by two for each divided surface with being spaced apart from each other by a predetermined distance. The number of the arc outlets 550 formed on each divided surface may vary.

The first to third arc outlets 550*a*, 550*b*, and 550*c* may be different from one another in position to be formed but have the same structure and function. Accordingly, in the following description, the first to third arc outlets 550*a*, 550*b*, and 550*c* will be collectively referred to as the arc outlet 550.

The arc outlet 550 may extend between the side surfaces 512, that is, in the left and right directions in the illustrated implementation. That is, the arc outlet 550 may extend in the horizontal direction. Although not illustrated, one end portion of the first arc outlet 550*a* and one end portion of the third arc outlet 550*c* that respectively face the side surfaces 512 may be open.

In the illustrated implementation, the arc outlet 550 may include a first inner surface 551, a second inner surface 552, a third inner surface 553, and a fourth inner surface 554.

The first inner surface 551 may extend in a direction toward each side surface 512, that is, in the left and right directions in the illustrated implementation. The first inner surface 551 may face the second inner surface 552 with being spaced apart from the second inner surface 552 by a predetermined distance.

The second inner surface 552 may extend in a direction toward each side surface 512, that is, in the left and right directions in the illustrated implementation. The second inner surface 552 may face the first inner surface 551 with being spaced apart from the first inner surface 551 by a predetermined distance.

The first inner surface 551 and the second inner surface 552 may be symmetrical with each other.

The third inner surface 553 may extend between end portions of the first inner surface 551 and the second inner surface 552 facing one of the side surfaces 512. That is, the third inner surface 553 may extend between right end portions of the first inner surface 551 and the second inner surface 552. The third inner surface 553 may continuously be formed with the first inner surface 551 and the second inner surface 552.

In the illustrated implementation, the third inner surface 553 may be flat. Alternatively, the third inner surface 553 may be convex in a direction toward the one side surface 512.

The third inner surface 553 may face the fourth inner surface 554 with being spaced apart from the fourth inner surface 554 by a predetermined distance.

The fourth inner surface 554 may extend between end portions of the first inner surface 551 and the second inner surface 552 facing another side surface 512. That is, the fourth inner surface 554 may extend between left end portions of the first inner surface 551 and the second inner surface 552. The fourth inner surface 554 may continuously be formed with the first inner surface 551 and the second inner surface 552.

In the illustrated implementation, the fourth inner surface 554 may be flat. Alternatively, the fourth inner surface 554 may be convex in a direction toward the another side surface 512.

The space portion 530 and the outside of the magnetic contactor 10 can communicate with each other by a space surrounded by the first to fourth inner surfaces 551, 552, 553, and 554.

Figure 22:
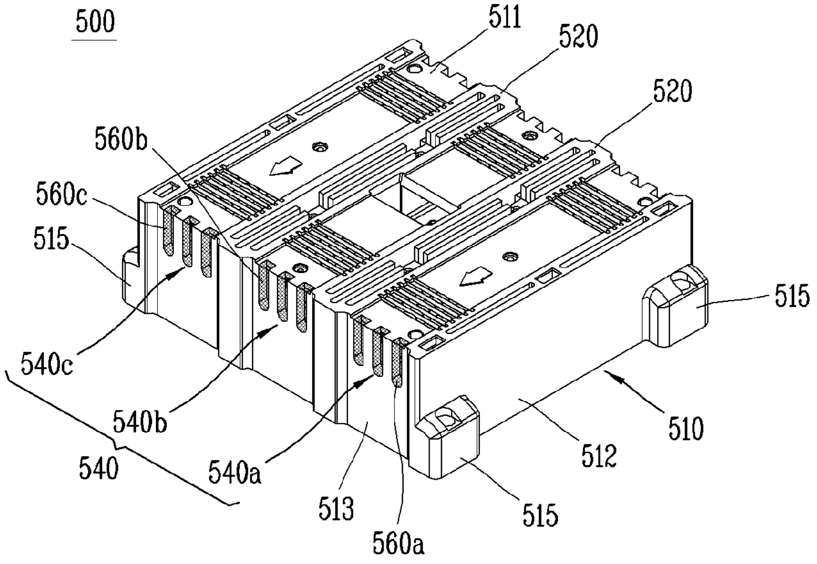
FIG. 22 is a perspective view illustrating a mesh portion provided in an arc box part in accordance with one implementation.
Figure 23:
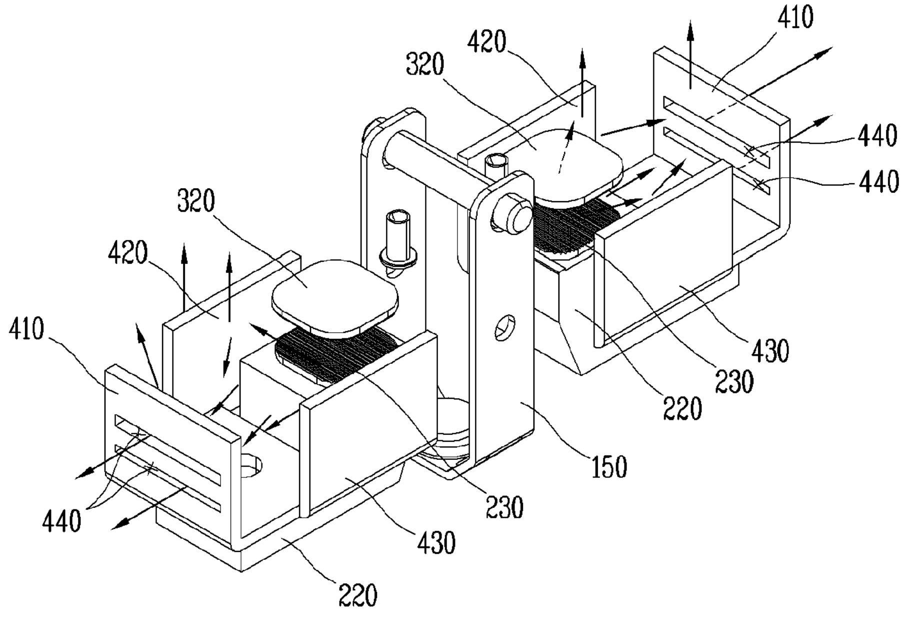
FIG. 23 is a cross-sectional view illustrating a path in which an arc moves within the arc box part of FIG. 7.
Figure 24:
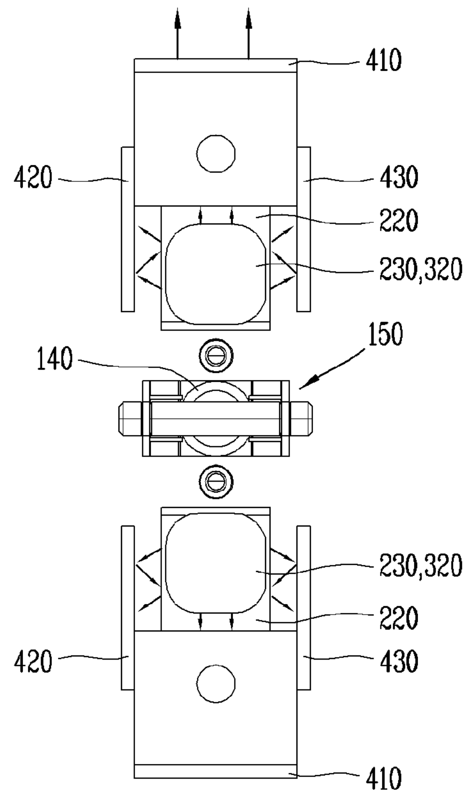
FIG. 24 is a perspective view illustrating a state in which an arc is discharged in a magnetic contactor in accordance with an implementation.
Figure 25:
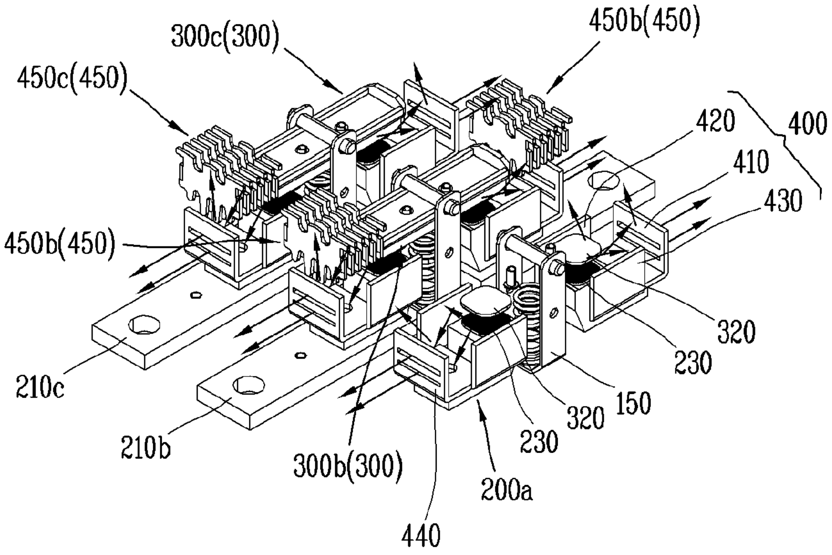
FIG. 25 is a perspective view illustrating a path in which an arc is moved along the fixed contactor part, the movable contactor part, and the arc extinguishing part of FIG. 7.
Figure 26:
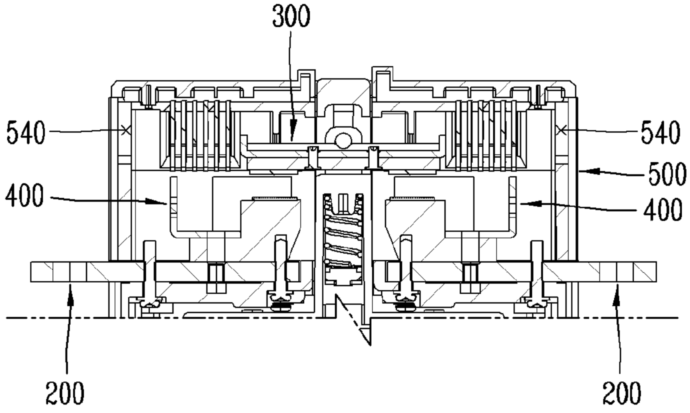
FIG. 26 is a perspective view illustrating a path in which an arc is moved along the fixed contactor part, the movable contactor part, and the arc extinguishing part of FIG. 11.
Figure 27:
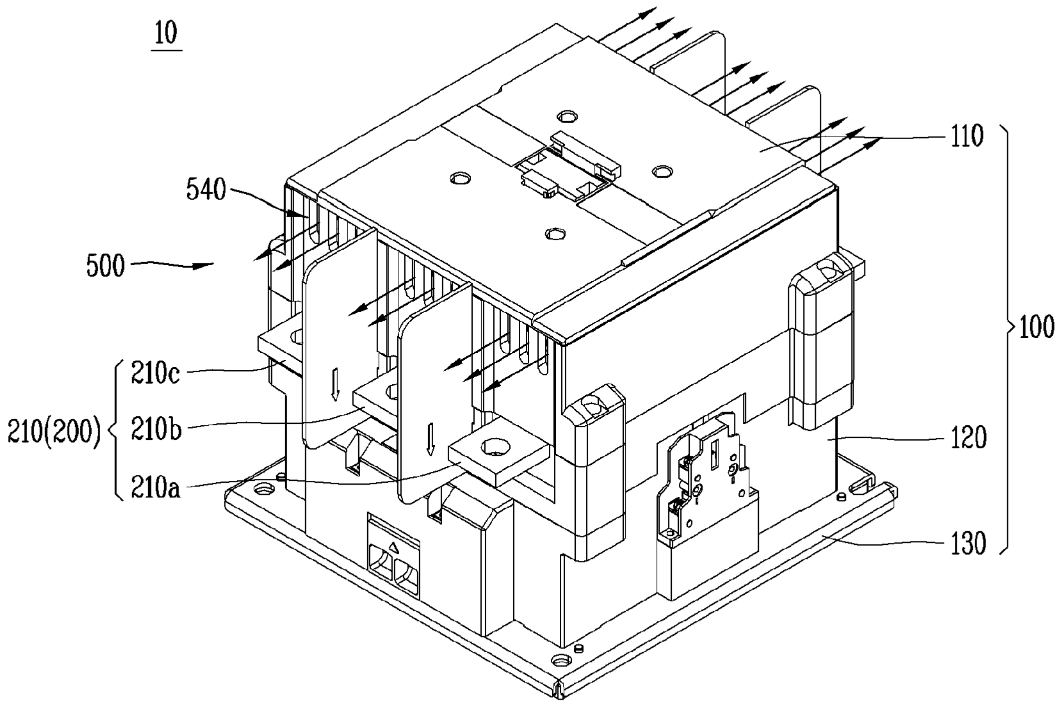
FIG. 27 is a planar view illustrating a path in which an arc is moved along the fixed contactor part, the movable contactor part, and the arc extinguishing part of FIG. 12.

Referring to FIG. 22, a mesh portion 560 provided in the magnetic contactor 10 according to the implementation is illustrated.

The mesh portion 560 may prevent foreign substances from entering the inner space of the magnetic contactor 10 through the arc outlet 540, 550.

The mesh portion 560 may be provided on each arc outlet 540, 550. The mesh portion 560 may cover the arc outlet 540, 550. The mesh portion 560 may be provided in plurality disposed on the arc outlets 540, 550, respectively.

In the illustrated implementation, the mesh portion 560 may include a first mesh portion 560*a*, a second mesh portion 560*b*, and a third mesh portion 560*c*. The first mesh portion 560*a* may cover the first arc outlet 540*a*, 550*a*. The second mesh portion 560*b* may cover the second arc outlet 540*b*, 550*b*. The third mesh portion 560*c* may cover the third arc outlet 540*c*, 550*c*.

The mesh portion 560 may include a plurality of openings. An arc generated inside the magnetic contactor 10 can be discharged to the outside through the openings. The openings may preferably have a size for allowing the arc to pass through the openings and preventing foreign substances such as dust from passing through the openings.

5. Description of Process of Extinguishing and Discharging Arc Generated in Magnetic Contactor 10 According to Implementation The magnetic contactor 10 according to the implementation may include the arc extinguishing part 400 and the arc box part 500. An arc generated inside the magnetic contactor 10 may be effectively discharged by the arc extinguishing part 400 and the arc box part 500. This can prevent components accommodated in the magnetic contactor 10 from being damaged due to the generated arc.

Hereinafter, a process of extinguishing and discharging a generated arc in the magnetic contactor 10 according to the implementation will be described in detail with reference to FIGS. 23 to 27.

As the fixed contactor 230 and the movable contactor 320 are separated from each other, an arc may be generated. The generated arc may move in several directions.

At this time, the space in which the fixed contactor 230 and the movable contactor 320 are in contact may be surrounded by the first to third wall portions 410, 420, and 430.

The first wall portion 410 may be located with being spaced apart from the fixed contactor 230 by a predetermined distance. Accordingly, it can be expected that the arc moved toward the first wall portion 410 is extinguished to some extent.

The arc through hole 440 may be formed through the first wall portion 410. Accordingly, some of the arc moved toward the first wall portion 410 may move toward the arc outlet 540, 550 through the arc through hole 440. The remaining arc may return to the space after colliding with the first wall portion 410.

On the other hand, the arc moved toward the second wall portion 420 and the third wall portion 430 may return to the space after colliding with the second wall portion 420 and the third wall portion 430.

Meanwhile, the grid 450 formed of a magnetic material may be disposed above the fixed contactor 230 and the movable contactor 320. Accordingly, the arc may proceed toward the grid 450 by magnetic attraction and may be segmented into several small arcs.

One side of the grid 450 facing the upper frame 110, namely, the upper end portion in the illustrated implementation may be located adjacent to the arc outlet 540, 550. Accordingly, the arc moved along the grid 450 may move toward the arc outlet 540, 550 at the upper end portion of the grid 450.

The arc outlet 540, 550 may allow the inside and the outside of the magnetic contactor 10 to communicate with each other. Accordingly, the arc can be discharged through the arc outlet 540, 550.

Through the process, the generated arc may not remain in any space inside the magnetic contactor 10. In addition, the generated arc may be guided to the arc outlet 540, 550 through the arc through hole 440 or the grid 450.

Accordingly, the generated arc can be quickly extinguished and moved toward the arc outlet 540, 550. Therefore, the generated arc may not remain inside the magnetic contactor 10, so that the operational reliability and durability of the magnetic contactor 10 can be improved.

On the other hand, as described above, the arc outlet 540, 550 may be provided with the mesh portion 560. The mesh portion 560 can prevent foreign substances outside the magnetic contactor 10 from being introduced into the inner space of the magnetic contactor 10.

This can improve the operational reliability and durability of the magnetic contactor 10.

Although it has been described above with reference to the preferred implementations of the present disclosure, it will be understood that those skilled in the art are able to variously modify and change the present disclosure without departing from the scope of the invention described in the claims below.

10: Magnetic contactor
100: Frame part
110: Upper frame
120: Lower frame
130: Base
140: Elastic portion
150: Support portion
160: Movable core
170: Coil
180: Fixed core
200: Fixed contactor part
**200*a***: First fixed contactor part
**200*b***: Second fixed contactor part
**200*c***: Third fixed contactor part
210: Terminal
**210*a***: First terminal
**210*b***: Second terminal
**210*c***: Third terminal
220: Fixed contactor support
230: Fixed contactor
300: Movable contactor part
**300*a***: First movable contactor part
**300*b***: Second movable contactor part
**300*c***: Third movable contactor part
310: Crossbar
320: Movable contactor
400: Arc extinguishing part
410: First wall portion
420: Second wall portion
430: Third wall portion
440: Arc through hole
450: Grid
**450*a***: First grid
**450*b***: Second grid
**450*c***: Third grid
500: Arc box part
510: Body portion
511: Upper surface
512: Side surface
513: Front surface
514: Rear surface
515: Coupling portion
516: Grid insertion portion
520: Partition
530: Space portion
**530*a***: First space portion
**530*b***: Second space portion
**530*c***: Third space portion
540: Arc outlet according to one implementation
**540*a***: First arc outlet
**540*b***: Second arc outlet
**540*c***: Third arc outlet
541: First inner surface
542: Second inner surface
543: Third inner surface
544: Opening
550: Arc outlet according to another implementation
**550*a***: First arc outlet
**550*b***: Second arc outlet
**550*c***: Third arc outlet
551: First inner surface
552: Second inner surface
553: Third inner surface
554: Fourth inner surface
560: Mesh portion
**560*a***: First mesh portion
**560*b***: Second mesh portion
**560*c***: Third mesh portion

The invention claimed is:

1. A magnetic contactor comprising:
a coil electrically connected to an outside;
a fixed core located adjacent to the coil and magnetized by a magnetic field produced by the coil;
a movable core spaced apart from the fixed core by a predetermined first distance and configured to move toward the fixed core by magnetic attraction generated by magnetization of the fixed core;
a crossbar connected to the movable core and including a movable contact;
a fixed contact spaced apart from the movable contact by a predetermined second distance;
a plurality of wall portions configured to surround the fixed contact; and,
wherein the plurality of wall portions comprises:
a first wall portion located spaced apart from the fixed contact by a predetermined third distance in a first direction,
a second wall portion located spaced apart from the fixed contact in a second direction by a predetermined fourth distance and spaced apart from the first wall portion in the first direction, and
a third wall portion located spaced apart from the fixed contact in a third direction, opposite to the second direction, by the predetermined fourth distance and facing the second wall portion with the fixed contact interposed therebetween, and spaced apart from the first wall portion in the first direction; and
a grid formed of a magnetic material and located spaced apart from the first wall portion by a predetermined fifth distance in a fourth direction perpendicular to the first direction,
wherein a first side of the second wall is separated from a first side of the first wall and a second side of the second wall is separated from a second side of the first wall,
wherein the plurality of wall portions is configured to induce an arc generated from between the fixed contact and the movable contact toward the grid.

2. The magnetic contactor of claim 1, wherein the crossbar extends ine the first direction.

3. The magnetic contactor of claim 2, wherein the first wall portion extends toward the movable contact by a predetermined length.

4. The magnetic contactor of claim 2, wherein the first wall portion comprises an arc through hole formed therethrough in the first direction.

5. The magnetic contactor of claim 4, wherein the arc through hole is provided in plurality disposed with being spaced apart by a predetermined sixth distance.

6. The magnetic contactor of claim 4, wherein the arc through hole extends at a predetermined angle with respect to the first direction.

7. The magnetic contactor of claim 4, wherein the first wall portion extends toward the movable contact by a predetermined length, and wherein one side of the arc through hole facing the movable contact is formed through the first wall portion.

8. The magnetic contactor of claim 2, wherein the second wall portion extends toward the movable contact by a predetermined sixth distance.

9. The magnetic contactor of claim 8, wherein the first direction is perpendicular to the second direction, wherein the third wall portion extends toward the movable contact by a predetermined length.

10. The magnetic contactor of claim 1, further comprising:

an arc box part defining an inner space to accommodate the grid, wherein the arc box part comprises an arc outlet located adjacent to a side of the grid extending away from the first wall portion, and formed therethrough such that the inner space of the arc box part communicates with the outside.

11. A magnetic contactor comprising:

a coil electrically connected to an outside;

a fixed core located adjacent to the coil and magnetized by a magnetic field produced by the coil;

a movable core spaced apart from the fixed core by a predetermined first distance and configured to move toward the fixed core by magnetic attraction generated by magnetization of the fixed core;

a crossbar connected to the movable core and including a movable contact;

a fixed contact spaced apart from the movable contact by a predetermined second distance;

a plurality of wall portions configured to surround the fixed contact, wherein the plurality of wall portions comprises:

a first wall portion disposed on a first side of the fixed contact, a second wall portion disposed on a second side of the fixed contact, wherein the second wall portion not in contact with the first wall portion, and a third wall portion disposed on a third side of the fixed contact, opposite to the second side, wherein the third wall portion is not in contact with the first wall portion and not in contact with the second wall portion, wherein each of the second wall portion and the third wall portion is located closer relative to the fixed contact than the first wall portion is located relative to the fixed contact; and a grid formed of a magnetic material and located spaced apart from the first wall portion.

12. The magnetic contactor of claim 11, wherein the first wall portion comprises a first portion of an arc extinguishing part bent to extend from a base disposed below the fixed contact in the first direction to extend a tip portion of the fist wall portion above the fixed contact in the first direction, wherein the second wall portion comprises a second portion of the arc extinguishing part bent to extend from the base from below the fixed contact to above the fixed contact in the first direction, and wherein the third wall portion comprises a third portion of the arc extinguishing part bent to extend from the base from below the fixed contact to above the fixed contact in the first direction.

13. The magnetic contactor of claim 11, wherein a cross-sectional area of each of the first wall portion, the second wall portion, and the third wall portion reduces in the first direction extending towards the grid.

* * * * *